US007117330B1

(12) United States Patent
Alverson et al.

(10) Patent No.: US 7,117,330 B1
(45) Date of Patent: Oct. 3, 2006

(54) SYNCHRONIZATION TECHNIQUES IN A MULTITHREADED ENVIRONMENT

(75) Inventors: Gail A. Alverson, Seattle, WA (US); Charles David Callahan, II, Seattle, WA (US); Simon H. Kahan, Seattle, WA (US); Brian D. Koblenz, Seattle, WA (US); Allan Porterfield, Bellevue, WA (US); Burton J. Smith, Seattle, WA (US)

(73) Assignee: Cray Inc., Seattle, WA (US)

( * ) Notice: Subject to any disclaimer, the term of this patent is extended or adjusted under 35 U.S.C. 154(b) by 167 days.

(21) Appl. No.: 10/461,950

(22) Filed: Jun. 12, 2003

Related U.S. Application Data

(63) Continuation of application No. 09/361,671, filed on Jul. 27, 1999, now Pat. No. 6,862,635, which is a continuation of application No. 09/192,207, filed on Nov. 13, 1998, now abandoned.

(51) Int. Cl.
*G06F 12/00* (2006.01)
(52) U.S. Cl. ............ 711/163; 711/210; 710/260; 710/266; 712/244
(58) Field of Classification Search ........... 711/163, 711/152, 210; 712/244; 710/260, 266
See application file for complete search history.

(56) References Cited

U.S. PATENT DOCUMENTS

| 4,819,234 A | 4/1989 | Huber |
|---|---|---|
| 4,860,285 A | 8/1989 | Miller et al. |
| 4,872,167 A | 10/1989 | Maezawa et al. |
| 5,168,554 A | 12/1992 | Luke |
| 5,301,325 A | 4/1994 | Benson |
| 5,333,280 A | 7/1994 | Ishikawa et al. |
| 5,450,575 A | 9/1995 | Sites |
| 5,504,932 A | 4/1996 | Vassiliadis et al. |
| 5,533,192 A | 7/1996 | Hawley et al. |
| 5,542,058 A | 7/1996 | Brown, III et al. |
| 5,557,761 A | 9/1996 | Chan |
| 5,560,029 A | 9/1996 | Papadopoulos et al. |
| 5,564,051 A | 10/1996 | Halliwell et al. |
| 5,581,764 A | 12/1996 | Fitzgerald |
| 5,594,864 A | 1/1997 | Trauben |
| 5,598,560 A | 1/1997 | Benson |
| 5,600,837 A | 2/1997 | Artieri |
| 5,632,032 A | 5/1997 | Ault et al. |

(Continued)

FOREIGN PATENT DOCUMENTS

DE 19710252 A1 2/1998

(Continued)

OTHER PUBLICATIONS

"Method of Tracing Events in Multi-Threaded OS/2 Applications," IBM Tech. Disclosure Bulletin, Sep. 1993, pp. 19-22.

(Continued)

*Primary Examiner*—Mano Padmanabhan
*Assistant Examiner*—Midys Rojas
(74) *Attorney, Agent, or Firm*—Perkins Coie LLP

(57) ABSTRACT

Various techniques for manipulating data using access states of memory, access control fields of pointers and operations, and exception raising and exception trapping in a multi-threaded computer system. In particular, the techniques include synchronization support for a thread blocked in a word, demand evaluation of values, parallel access of multiple threads to a list, synchronized and unsynchronized access to a data buffer, use of forwarding to avoid checking for an end of a buffer, use of sentinel word to detect access past a data structure, concurrent access to a word of memory using different synchronization access modes, and use of trapping to detect access to restricted memory.

48 Claims, 25 Drawing Sheets

U.S. PATENT DOCUMENTS

| | | | |
|---|---|---|---|
| 5,652,889 | A | 7/1997 | Sites |
| 5,712,996 | A | 1/1998 | Schepers |
| 5,754,855 | A | 5/1998 | Miller et al. |
| 5,768,591 | A | 6/1998 | Robinson |
| 5,768,592 | A | 6/1998 | Chang |
| 5,774,721 | A | 6/1998 | Robinson |
| 5,787,245 | A | 7/1998 | You et al. |
| 5,805,878 | A | 9/1998 | Rahman et al. |
| 5,805,892 | A | 9/1998 | Nakajima |
| 5,812,811 | A | 9/1998 | Dubey et al. |
| 5,826,265 | A | 10/1998 | Van Huben et al. |
| 5,867,643 | A | 2/1999 | Sutton |
| 5,877,766 | A | 3/1999 | Bates et al. |
| 5,881,264 | A | 3/1999 | Kurosawa |
| 5,887,166 | A | 3/1999 | Mallick et al. |
| 5,901,315 | A | 5/1999 | Edwards et al. |
| 5,903,730 | A | 5/1999 | Asai et al. |
| 5,913,925 | A | 6/1999 | Kahle et al. |
| 5,926,227 | A | 7/1999 | Schoner et al. |
| 5,931,926 | A | 8/1999 | Yeung et al. |
| 5,953,530 | A | 9/1999 | Rishi et al. |
| 5,961,639 | A | 10/1999 | Mallick et al. |
| 5,966,539 | A | 10/1999 | Srivastava |
| 5,974,483 | A | 10/1999 | Ray et al. |
| 5,978,902 | A | 11/1999 | Mann |
| 6,002,872 | A | 12/1999 | Alexander, III et al. |
| 6,002,879 | A | 12/1999 | Radigan et al. |
| 6,009,269 | A | 12/1999 | Burrows et al. |
| 6,029,005 | A | 2/2000 | Radigan |
| 6,049,671 | A | 4/2000 | Slivka et al. |
| 6,058,493 | A | 5/2000 | Talley |
| 6,059,840 | A | 5/2000 | Click, Jr. |
| 6,072,952 | A | 6/2000 | Janakiraman |
| 6,094,716 | A | 7/2000 | Witt |
| 6,101,524 | A | 8/2000 | Choi et al. |
| 6,112,293 | A | 8/2000 | Witt |
| 6,151,701 | A | 11/2000 | Humphreys et al. |
| 6,151,704 | A | 11/2000 | Radigan |
| 6,154,796 | A | 11/2000 | Kuo et al. |
| 6,161,160 | A | 12/2000 | Niu et al. |
| 6,182,195 | B1 * | 1/2001 | Laudon et al. ............... 711/141 |
| 6,263,410 | B1 | 7/2001 | Kao et al. |
| 6,473,818 | B1 | 10/2002 | Niu et al. |

FOREIGN PATENT DOCUMENTS

| | | |
|---|---|---|
| EP | 0422945 | 4/1991 |
| EP | 0537098 | 4/1993 |
| EP | 0855648 | 7/1998 |
| EP | 0864979 | 9/1998 |
| EP | 0455966 | 11/1999 |
| GB | 2307760 | 6/1997 |

OTHER PUBLICATIONS

Adelberg, Brad et al., "The Strip Rule System for Efficiently Maintaining Derived Data," Sigmond Record, Association for Computing Machinery, New York, vol. 26, No. 2, Jun. 1, 1997.
Agrawal, Gagan et al., "Interprocedural Data Flow Based Optimizations for Compilation of Irregular Problems," Annual Workshop on Languages and Compilers for Parallel Computing, 1995.
Agrawal, Hiralal, "Dominators, Super Blocks and Program Coverage," 21st ACM SIGPLAN-SIGACT Symposium on Principles of Programming Languages, Portland, Oregon, Jan. 17-21, 1994.
Alverson, Gail et al., "Processor Management in the Tera MTA System," 1995.
Alverson, Gail et al., "Scheduling on the Tera MTA," Job Scheduling Strategies for Parallel Processing, 1995.
Alverson, Gail et al., "Tera Hardware-Software Cooperation," Proceedings of Supercomputing 1997, San Jose, California, Nov. 1997.
Alverson, Robert et al, "The Tera Computer System," Proceedings of 1990 ACM International Conference on Supercomputing, Jun. 1990.
Anderson, Jennifer, et al., "Continuous Profiling: Where Have All The Cycles Gone?," Operating Systems Review, ACM Headquarters, New York, vol. 31, NO. 5, Dec. 1, 1997.
Bailey, D.H. et al., "The NAS Parallel Benchmarks—Summary and Preliminary Results," Numerical Aerodynamic Simulation (NAS) Systems Divison, NASA Ames Research Center, California, 1991.
Briggs, Preston et al., "Coloring Heuristics for Register Allocation," Department of Computer Science, Rice University, Houston, Texas, Jun. 1989.
Briggs, Preston et al., "Coloring Register Pairs," ACM Letters on Programming Languages and Systems, vol. 1, No. 1, Mar. 1992, pp. 3-13.
Briggs, Preston et al., "Effective Partial Redundancy Elimination," ACM SIGPLAN Notices, Association for Computing Machinery, New York, vol. 29, No. 6, Jun. 1, 1994.
Callahan, David et al., A Future-Based Parallel Language for a General -Purpose Highly-Parallel Computer, Languages and Compilers for Parallel Computing, MIT Press, 1990.
Callahan, David et al., "Improving Register Allocation for Subscripted Variables," Proceedings of the ACM SIGPLAN Conference on Programming Language Design and Implementation, White Plains, New York, Jun. 20-22, 1990.
Callahan, David et al., "Register Allocation via Hierarchical Graph Coloring," Proceedings of the ACM SIGPLAN '91 Conference on Programming Language Design and Implementation, Toronto, Canada, Jun. 26, 28-1991.
Callahan, David, "Recognizing and Parallelizing Bounded Recurrences," Aug. 1991.
Chaudhuri, Surajit et al., "An Overview of Data Warehousing and OLAP Technology," Sigmod Record, Association for Computing, New York, vol. 26, No. 1, Mar. 1997.
Chow, Fred C. et al., "The Priority-Based Coloring Approach to Register Allocation," ACM Transactions on Programming Languages and Systems, vol. 12, No. 4, Oct. 1990, pp. 501-536.
Click, Cliff, "Global Code Motion, Global Value Numbering," ACM SIGPLAN Notices, Association for Computing Machinery, New York, vol. 30, No. 6, Jun. 1, 1995.
Cook, Jonathan E. et al., "Event Based Detection of Concurrency," SIGSOFT '98 ACM, 1998, pp.34-45.
Davidson, Jack W. et al., Reducing the Cost of Branches by Using Registers, "Proceedings of the 17th Annual Symposium on Computer Architecture," Seattle, Washington, May 28-31, 1990.
Galarowicz, Jim et al., "Analyzing Message Passing Programs on the Cray T3E with PAT and VAMPIR," Research Report, "Online!", May 1998.
George, Lal et al., "Iterated Register Coalescing," ACM Transactions on Programming Languages and Systems, vol. 18, No. 3, May 1996, pp. 300-324.
Goldman, Kenneth J., "Introduction to Data Structures," 1996 (retrieved from Internet, http://www.cs.wustl.edu{kjg/CS101_SP97/Notes?Data Structures/structures.html.
Hayashi, H. et al., "ALPHA: A High Performance Lisp Machine Equipped with a New Stack Structure and Garbage Collection System," 10th Annual International Symposium on Computer Architecture, 1983.
Ji, Minwen et al., "Performance Measurements for Multithreaded Programs," SIGMETRICS '98 , ACM, 1998, pp. 168-170.
Knoop, Jens et al., "The Power of Assignment Motion," ACM SIGPLAN '95 Conference on Programming Language Design and Implementation, La Jolla, California, Jun. 18-21, 1995.
Kolte, Priyadarshan et al., "Load/Store Range Analysis for Global Register Allocation," ACM-SIGPLAN, Jun. 1993.
Korry, Richard et al., "Memory Management in the Tera MTA System," 1995.
Lang, Tomas et al., "Reduced Register Saving/Restroring in Single-Window Register Files," Computer Architecture News, vol. 14, No. 3, Jun. 1986.
Linton, Mark A., "The Evolution of Dbx, "USENIX Summer Conference, Jun. 11-15, 1990.
Major System Characterisitics of the TERA MTA, 1995.

Ram, Aswhin et al., "Parallel Garbage Collection Without Synchronization Overhead," 12th Annual Symposium on Computer Architecture, Jun. 17, 1985.

Shim, SangMin et al., "Split-Path Enhanced Pipeline Scheduling for Loops with Control Flows," IEEE, Dec. 2, 1998.

Smith, Burton, "Opportunities for Growth in High Performance Computing,", Nov. 1995.

Smith, Burton, "The End of Architecture," Keynote Address Presented at the 17th Annual Symposium on Computer Architecture, Seattle, Washington, May 29, 1990.

Smith, Burton, The Quest for General-Purpose Parallel Computing.

Sreedhar, Vugranam C. et al., "Incremental Computation of Dominator Trees," ACM SIGPLAN Notices, Association for Computing Machinery, New York, vol. 30, No. 3, Mar. 1, 1995.

Tera Computer Company, "TERA MTA Principles of Operation", Nov. 18, 1997, 257pages.

Touzeau, Roy F., "A Fortran Complier for the FPS-164 Scientific Computer," Proceedings of the ACM SIGPLAN '84 Symposium on Complier Construction, SIGPLAN Notices 19(6):48-57, Jun. 1984.

Tsai, Jenn-Yuan et al., "Performance Study of a Concurrent Multithreaded Processor," IEEE, 1998, pp. 24-35.

* cited by examiner

| sync mode / current f/e | load | | | store | | |
|---|---|---|---|---|---|---|
| | normal | sync | future | normal | sync | future |
| full | succeed | succeed | succeed | succeed | block | full |
| | full | empty * | full | full * | N/A | N/A |
| empty | succeed | block | block | succeed | succeed | block |
| | empty | N/A | N/A | full * | full * | N/A |

FIG. 4

Data Structure

| 1 | |
| 1 | |
| ⋮ | ⋮ |
| 1 | |
| 1 | |

Trap 1

*Fig. 25*

SYNCHRONIZATION TECHNIQUES IN A MULTITHREADED ENVIRONMENT

CROSS-REFERENCE TO RELATED APPLICATION

This application is a continuation of U.S. patent application Ser. No. 09/361,671 filed Jul. 27, 1999, now U.S. Pat. No. 6,862,635 which is a continuation of U.S. patent application Ser. No. 09/192,207 filed Nov. 13, 1998, which are hereby incorporated by reference.

TECHNICAL FIELD

This invention relates generally to synchronization techniques for computer systems.

BACKGROUND OF THE INVENTION

Parallel computer architectures generally provide multiple processors that can each be executing different tasks simultaneously. One such parallel computer architecture is referred to as a multithreaded architecture (MTA). The MTA supports not only multiple processors but also multiple streams executing simultaneously in each processor. The processors of an MTA computer are interconnected via an interconnection network. Each processor can communicate with every other processor through the interconnection network. FIG. 1 provides a high-level overview of an MTA computer. Each processor 101 is connected to the interconnection network and memory 102. Each processor contains a complete set of registers 101a for each stream. In addition, each processor also supports multiple protection domains 101b so that multiple user programs can be executing simultaneously within that processor.

Each MTA processor can execute multiple threads of execution simultaneously. Each thread of execution executes on one of the 128 streams supported by an MTA processor. Every clock time period, the processor selects a stream that is ready to execute and allows it to issue its next instruction. Instruction interpretation is pipelined by the processor, the network, and the memory. Thus, a new instruction from a different stream may be issued in each time period without interfering with other instructions that are in the pipeline. When an instruction finishes, the stream to which it belongs becomes ready to execute the next instruction. Each instruction may contain up to three operations (i.e., a memory reference operation, an arithmetic operation, and a control operation) that are executed simultaneously.

The state of a stream includes one 64-bit Stream Status Word ("SSW"), 32 64-bit General Registers ("R0–R31"), and eight 32-bit Target Registers ("T0–T7"). Each MTA processor has 128 sets of SSWs, of general registers, and of target registers. Thus, the state of each stream is immediately accessible by the processor without the need to reload registers when an instruction of a stream is to be executed.

The MTA uses program addresses that are 32 bits long. The lower half of an SSW contains the program counter ("PC") for the stream. The upper half of the SSW contains various mode flags (e.g., floating point rounding, lookahead disable), a trap disable mask (e.g., data alignment and floating point overflow), and the four most recently generated condition codes. The 32 general registers are available for general-purpose computations. Register R0 is special, however, in that it always contains a 0. The loading of register R0 has no effect on its contents. The instruction set of the MTA processor uses the eight target registers as branch targets. However, most control transfer operations only use the low 32 bits to determine a new program counter. One target register (T0) points to the trap handler, which may be an unprivileged program. When a trap occurs, the trapping stream starts executing instructions at the program location indicated by register T0. Trap handling is lightweight and independent of the operating system and other streams. A user program can install trap handlers for each thread to achieve specific trap capabilities and priorities without loss of efficiency.

Each MTA processor supports as many as 16 active protection domains that define the program memory, data memory, and number of streams allocated to the computations using that processor. Each executing stream is assigned to a protection domain, but which domain (or which processor, for that matter) need not be known by the user program.

The MTA divides memory into program memory, which contains the instructions that form the program, and data memory, which contains the data of the program. The MTA uses a program mapping system and a data mapping system to map addresses used by the program to physical addresses in memory. The mapping systems use a program page map and a data segment map. The entries of the data segment map and program page map specify the location of the segment in physical memory along with the level of privilege needed to access the segment.

The number of streams available to a program is regulated by three quantities slim, scur, and sres associated with each protection domain. The current numbers of streams executing in the protection domain is indicated by scur; it is incremented when a stream is created and decremented when a stream quits. A create can only succeed when the incremented scur does not exceed sres, the number of streams reserved in the protection domain. The operations for creating, quitting, and reserving streams are unprivileged. Several streams can be reserved simultaneously. The stream limit slim is an operating system limit on the number of streams the protection domain can reserve.

When a stream executes a CREATE operation to create a new stream, the operation increments scur, initializes the SSW for the new stream based on the SSW of the creating stream and an offset in the CREATE operation, loads register (T0), and loads three registers of the new stream from general purpose registers of the creating stream. The MTA processor can then start executing the newly created stream. A QUIT operation terminates the stream that executes it and decrements both sres and scur. A QUIT_PRESERVE operation only decrements scur, which gives up a stream without surrendering its reservation.

The MTA supports four levels of privilege: user, supervisor, kernel, and IPL. The IPL level is the highest privilege level. All levels use the program page and data segment maps for address translation, and represent increasing levels of privilege. The data segment map entries define the minimum levels needed to read and write each segment, and the program page map entries define the exact level needed to execute from each page. Each stream in a protection domain may be executing at a different privileged level.

Two operations are provided to allow an executing stream to change its privilege level. A "LEVEL_ENTER lev" operation sets the current privilege level to the program page map level if the current level is equal to lev. The LEVEL_ENTER operation is located at every entry point that can accept a call from a different privilege level. A trap occurs if the current level is not equal to lev. The "LEV- EL_RETURN lev" operation is used to return to the original privilege level. A trap occurs if lev is greater than the current privilege level.

An exception is an unexpected condition raised by an event that occurs in a user program, the operating system, or the hardware. These unexpected conditions include various floating point conditions (e.g., divide by zero), the execution of a privileged operation by a non-privileged stream, and the failure of a stream create operation. Each stream has an exception register. When an exception is detected, then a bit in the exception register corresponding to that exception is set. If a trap for that exception is enabled, then control is transferred to the trap handler whose address is stored in register T0. If the trap is currently disabled, then control is transferred to the trap handler when the trap is eventually enabled assuming that the bit is still set in the exception register. The operating system can execute an operation to raise a domain_signal exception in all streams of a protection domain. If the trap for the domain_signal is enabled, then each stream will transfer control to its trap handler.

Each memory location in an MTA computer has four access state bits in addition to a 64-bit value. These access state bits allow the hardware to implement several useful modifications to the usual semantics of memory reference. These access state bits are two data trap bits, one full/empty bit, and one forward bit. The two data trap bits allow for application-specific lightweight traps, the forward bit implements invisible indirect addressing, and the full/empty bit is used for lightweight synchronization. The behavior of these access state bits can be overridden by a corresponding set of bits in the pointer value used to access the memory. The two data trap bits in the access state are independent of each other and are available for use, for example, by a language implementer. If a trap bit is set in a memory location, then an exception will be raised whenever that location is accessed if the trap bit is not disabled in the pointer. If the corresponding trap bit in the pointer is not disabled, then a trap will occur.

The forward bit implements a kind of "invisible indirection." Unlike normal indirection, forwarding is controlled by both the pointer and the location pointed to. If the forward bit is set in the memory location and forwarding is not disabled in the pointer, the value found in the location is interpreted as a pointer to the target of the memory reference rather than the target itself. Dereferencing continues until either the pointer found in the memory location disables forwarding or the addressed location has its forward bit cleared.

The full/empty bit supports synchronization behavior of memory references. The synchronization behavior can be controlled by the full/empty control bits of a pointer or of a load or store operation. The four values for the full/empty control bits are shown below.

| VALUE | MODE | LOAD | STORE |
|---|---|---|---|
| 0 | normal | read regardless | write regardless and set full |
| 1 | | reserved | reserved |
| 2 | future | wait for full and leave full | wait for full and leave full |
| 3 | sync | wait for full and set empty | wait for empty and set full |

When the access control mode (i.e., synchronization mode) is future, loads and stores wait for the full/empty bit of memory location to be accessed to be set to full before the memory location can be accessed. When the access control mode is sync, loads are treated as "consume" operations and stores are treated as "produce" operations. A load waits for the full/empty bit to be set to full and then sets the full/empty bit to empty as it reads, and a store waits for the full/empty bit to be set to empty and then sets the full/empty bit to full as it writes. A forwarded location (i.e., its forward bit is set) that is not disabled (i.e., by the access control of a pointer) and that is empty (i.e., full/empty bit is set to empty) is treated as "unavailable" until its full/empty bit is set to full, irrespective of access control.

The full/empty bit may be used to implement arbitrary indivisible memory operations. The MTA also provides a single operation that supports extremely brief mutual exclusion during "integer add to memory." The FETCH_ADD operation loads the value from a memory location and stores the sum of that value and another value back into the memory location.

Each protection domain has a retry limit that specifies how many times a memory access can fail in testing full/empty bit before a data blocked exception is raised. If the trap for the data blocked exception is enabled, then a trap occurs. The trap handler can determine whether to continue to retry the memory access or to perform some other action. If the trap is not enabled, then the next instruction after the instruction that caused the data blocked exception is executed.

A speculative load occurs typically when a compiler generates code to issue a load operation for a data value before it is known whether the data value will actually be accessed by the program. The use of speculative loads helps reduce the memory latency that would result if the load operation was only issued when it was known for sure whether the program actually was going to access the data value. Because a load is speculative in the sense that the data value may not actually be accessed by the program, it is possible that a speculative load will load a data value that the program does not access. The following statements indicate program statement for which a compiler may generate a speculative load:

if i<N
        x=buffer[i]
    endif

The following statement illustrate the speculative load that is placed before the "if" statement.

r=buffer[i]
    if i<N
        x=r
    endif

The compiler generated code to load the data value for buffer[i] into a general register "r" and placed it before the code generated for the "if" statement condition. The load of the data value could cause an exception. For example, if the index i was so large that an invalid memory location was being accessed. If the "if" statement condition is satisfied, then the exception would have eventually occurred, but at a later time. In addition, if the "if" statement condition is not satisfied, then no exception would occur. To prevent a speculative load from causing an exception to occur or occur too early, the MTA has a "poison" bit for each general register. Whenever a load occurs, the poison bit is set or cleared depending on whether an exception would have been raised. If the data in a general register is then used while the corresponding poison bit is set, then an exception is raised at the time of use. In the above example, the "r=buffer[i]"

statement would not raise an exception, but would set the corresponding poison bit if the address is invalid. An exception, however, would be raised when the "x=r" statement is executed accessing that general register because its poison bit is set. The deferring of the exceptions and setting of the poison bits can be disabled by a speculative load flag in the SSW.

FIG. 2A illustrates the layout of the 64-bit exception register. The upper 32-bits contain the exception flags, and the lower 32 bits contain the poison bits. Bits 40–44 contain the flags for the user exceptions, which include a create stream exception, a privileged instruction exception, a data alignment exception, and a data blocked exception. A data blocked exception is raised when a data memory retry exception, a trap 0 exception, a trap 1 exception, or a long memory latency timeout is generated. The program handling a data blocked exception is responsible for determining the cause of the data blocked exception. The exception register contains one poison bit for each of the 32 general registers. If the poison bit is set, then an attempt to access the content of the corresponding register will raise an exception.

FIG. 2B illustrates the layout of the 64-bit stream status word. The lower 32 bits contain the program counter, bits 32–39 contain mode bits, bits 40–51 contain a trap mask, and bits 52–63 contain the condition codes of the last four instructions executed. Bit 37 within the mode bits indicates whether speculative loads are enabled or disabled. Bit 48 within the trap mask indicates whether a trap on a user exception is enabled (bits 40–44 of the SSW). Thus, traps for the user exceptions are enabled or disabled as a group.

FIG. 2C illustrates the layout of a word of memory and in particular a pointer stored in a word of memory. Each word of memory contains a 64-bit value and a 4-bit access state. The 4-bit access state is described above. When the 64-bit value is used to point to a location in memory, it is referred to a "pointer." The lower 48 bits of the pointer contains the address of the memory location to be accessed, and the upper 16 bits of the pointer contain access control bits. The access control bits indicate how to process the access state bits of the addressed memory location. One forward disable bit indicates whether forwarding is disabled, two full/empty control bits indicate the synchronization mode; and four trap 0 and 1 disable bits indicate whether traps are disabled for stores and loads, separately. If the forward disable bit is set, then no forwarding occurs regardless of the setting of the forward enable bit in the access state of the addressed memory location. If the trap 1 store disable bit is set, then a trap will not occur on a store operation, regardless of the setting of the trap 1 enable bit of the access state of the addressed memory location. The trap 1 load disable, trap 0 store disable, and trap 0 load disable bits operate in an analogous manner. Certain operations include a 5-bit access control operation field that supersedes the access control field of a pointer. The 5-bit access control field of an operation includes a forward disable bit, two full/empty control bits, a trap 1 disable bit, and a trap 0 disable bit. The bits effect the same behavior as described for the access control pointer field, except that each trap disable bit disables or enables traps on any access and does not distinguish load operations from store operations.

When a memory operation fails (e.g., synchronized access failure), an MTA processor saves the state of the operation. A trap handler can access that state. That memory operation can be redone by executing a redo operation (i.e., DATA_OP_REDO) passing the saved state as parameters of the operation. After the memory operation is redone (assuming it does not fail again), the trapping stream can continue its execution at the instruction after the trapping instruction.

The appendix contains the "Principles of Operation" of the MTA, which provides a more detailed description of the MTA.

SUMMARY OF THE INVENTION

Embodiments of the present invention provide various techniques for synchronization. In one embodiment, the present invention provides a method and system for processing a thread waiting for synchronized access to a memory location. When access by a thread to the memory location is blocked, the system enables an exception to be raised when that memory location is accessed by another thread and blocks execution of the thread. When an exception is raised as a result of access by another thread to that memory location, the system completes the access by that other thread to that memory location. The system then restarts execution of the blocked thread. In this way, a thread does not need to periodically poll the memory location to determine whether the thread can be unblocked and there is no overhead when the thread does not need to wait.

Another aspect of the present invention provides a method and system for deferring calculation of a value until the value is accessed. The system first enables an exception to be raised when a memory location is accessed. When an exception is raised as a result of access to that memory location, the system calculates the value associated with the memory location. The system then provides the calculated value as the result of the access to that memory location. In this way, the value need only be calculated when, and if, it is needed.

Another aspect of the present invention provides a method and system for detecting access to uninitialized memory. The system first enables an exception to be raised when a memory location is accessed. When an exception is raised as a result of access to that memory location and when the access is a write access, the system disables the raising of the exception and then allows the write access to the memory location. When the access is a read access, the system indicates that access to uninitialized memory has occurred. In this way, the system can report a fatal error when a read occurs to uninitialized memory.

Another aspect of the present invention provides a method and system for detecting access to protected memory. The system first enables an exception to be raised when a memory location is accessed. When accessing the memory location with a trap for the exception enabled, the system detects and prevents access to that memory location. When accessing the memory location with a trap for the exception disabled, the system allows the access to that memory location. In this way, a protected program can access protected memory by disabling the trapping of the exception.

Another aspect of the present invention provides a method and system for accessing a collection of data items. When adding a data item to the collection, the system fetches and adds to a write counter that points to a bucket within a bucket array. The system then reads from the bucket pointed to by the fetched write pointer using a synchronization access mode of sync. The system stores the data item in association (e.g., a limited list associated with the bucket) with the bucket pointed to by the fetched write pointer. The system writes to the bucket pointed to by the fetched write pointer using a synchronization access mode of sync. In this way, multiple threads can be adding to the collection simultaneously since each thread can be writing to a different bucket.

Another aspect of the present invention provides a method and system for accessing a buffer of data. The system defines a write pointer to point to a location within the buffer. When adding data to the buffer, the system fetches the write pointer, adds an indication of a size of the data to the write pointer, and stores the data into the buffer starting at a location indicated by the fetched write pointer. The system then sets the synchronization access mode of the write pointer to be either normal or sync to effect the behavior of adding data to the buffer. When the synchronization access mode is sync, then data added to the buffer will not overwrite data that has not yet been read from the buffer. When the synchronization access mode is normal, that data will be overwritten.

BRIEF DESCRIPTION OF THE DRAWINGS

FIG. 4 contains a table illustrating whether access to a word of memory would be successful.

FIG. 25 is a block diagram illustrating the data structure with the trap 0 enable bit set in each word of the data structure.

DETAILED DESCRIPTION OF THE INVENTION

Embodiments of the present invention provide various techniques for manipulating data using the access states of memory, access control fields of pointers and operations, and exception raising and exception trapping. In particular, the techniques include synchronization support for a thread blocked in a word, demand evaluation of values, parallel access of multiple threads to a list, synchronized and unsynchronized access to a data buffer, and other techniques as described below in detail.

Synchronization Support

Figure 1:
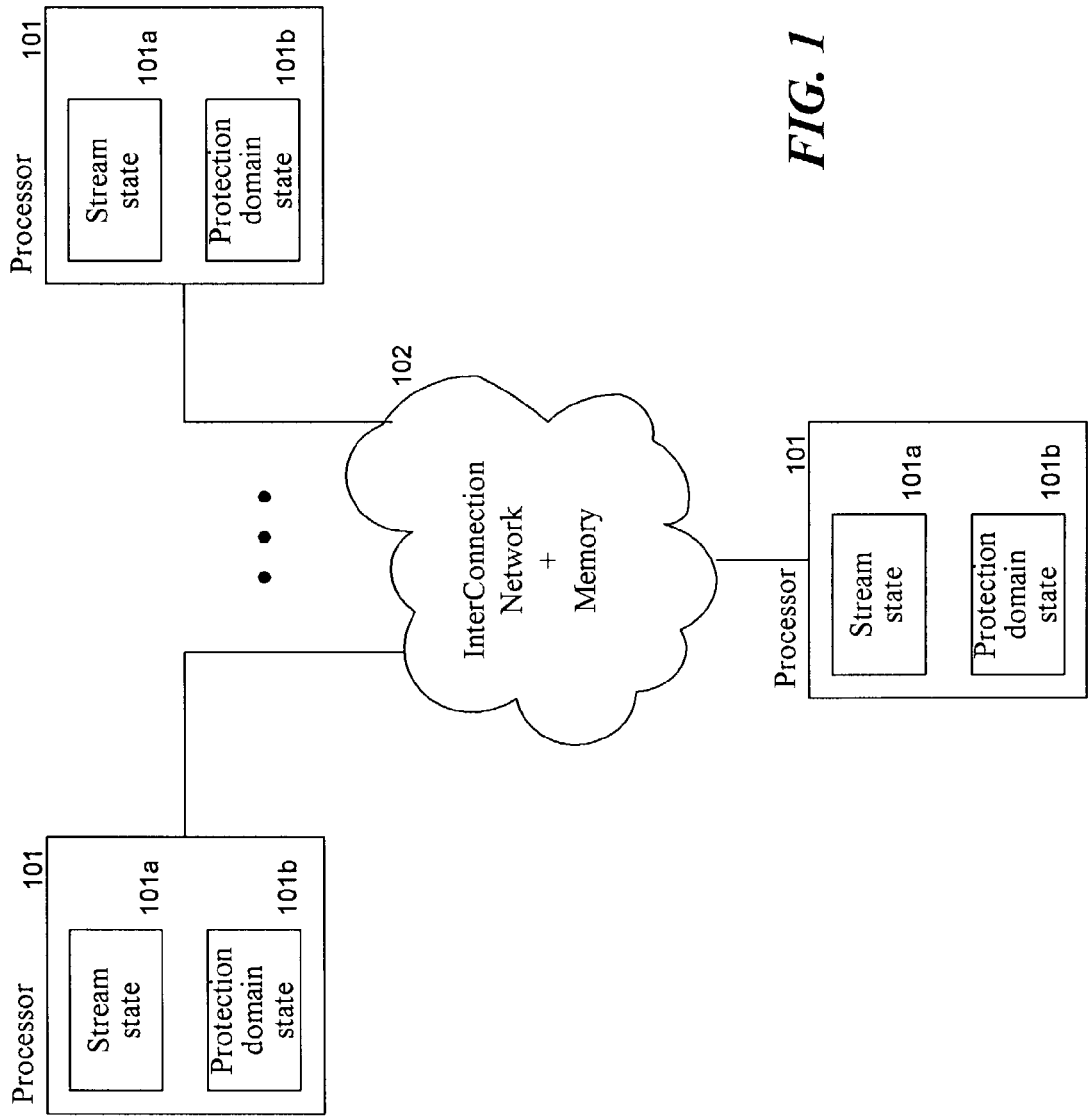
FIG. 1 provides a high-level overview of an MTA computer. Each processor 101 is connected to the interconnection network and memory 102.
Figure 2A:
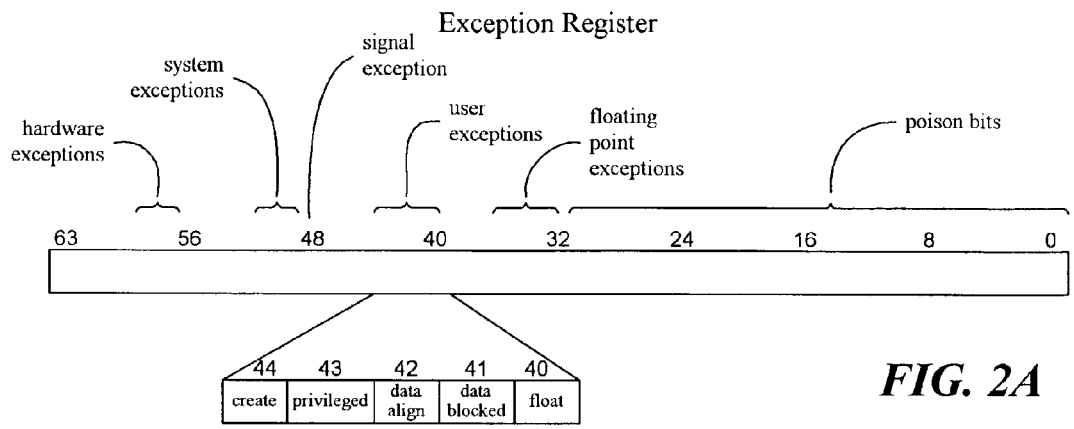
FIG. 2A illustrates the layout of the 64-bit exception register.
Figure 2B:
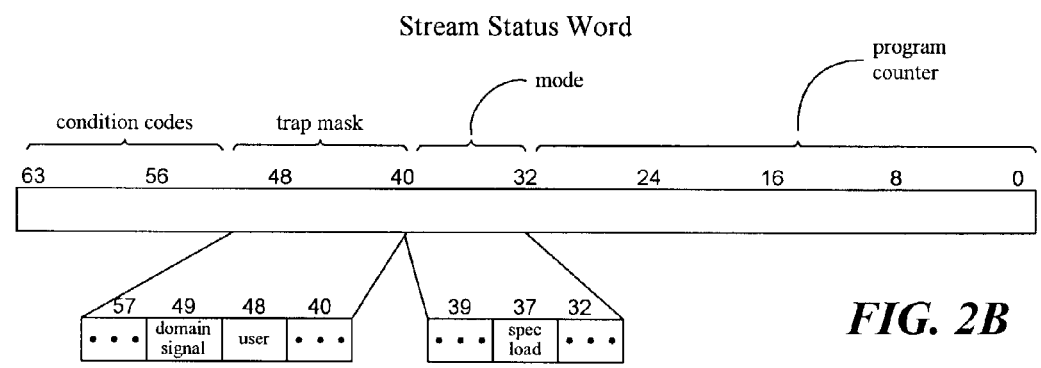
FIG. 2B illustrates the layout of the 64-bit stream status word.
Figure 2C:
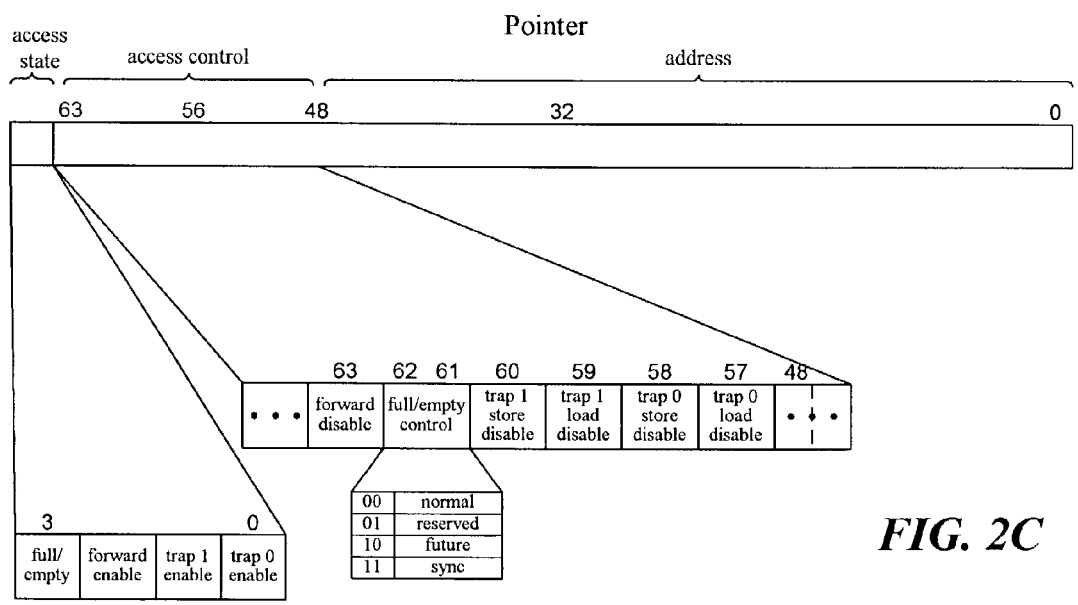
FIG. 2C illustrates the layout of a word of memory and in particular a pointer stored in a word of memory.
Figure 3:
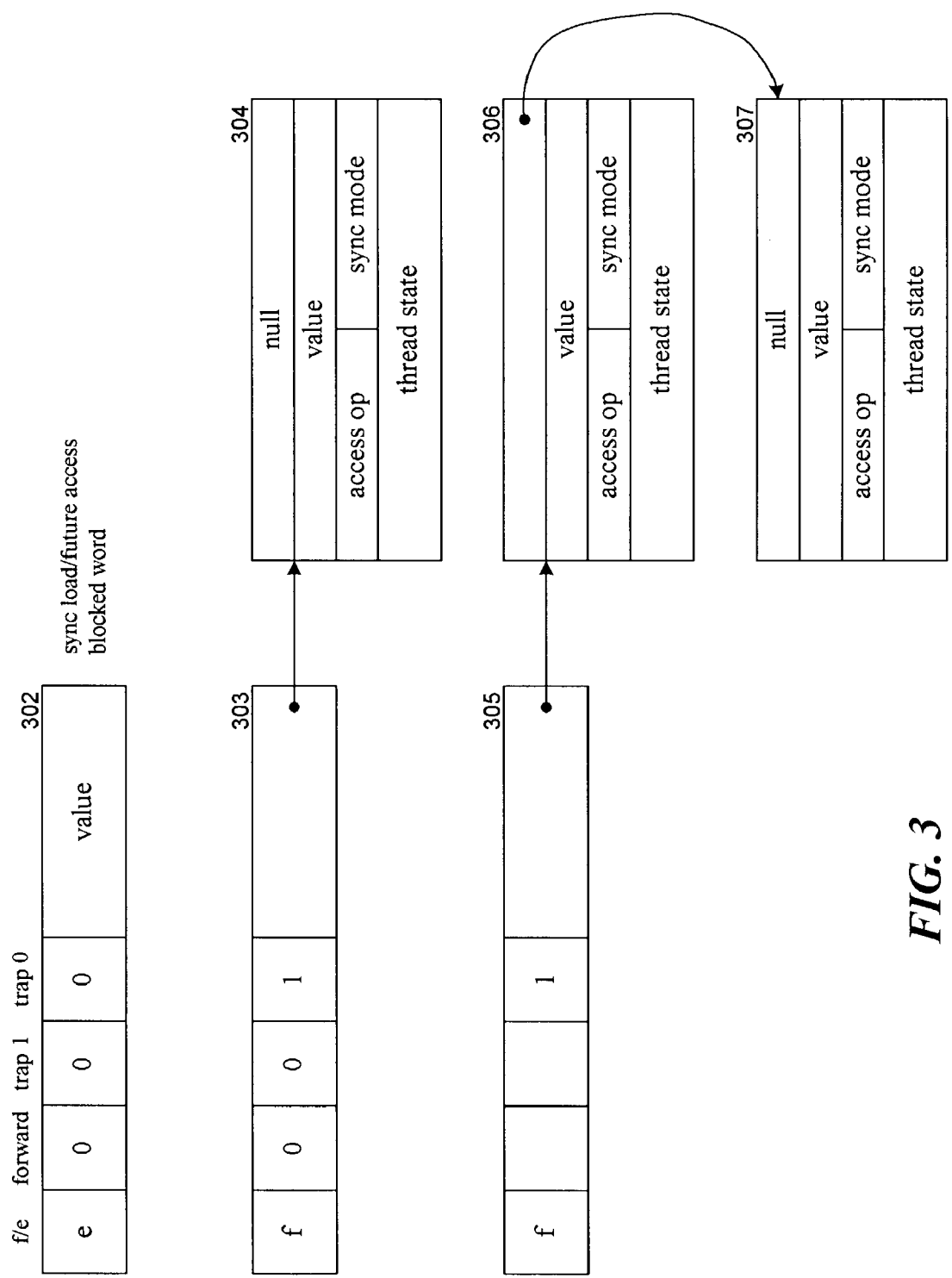
FIG. 3 is a block diagram illustrating the synchronization support of the present invention.

FIG. 3 is a block diagram illustrating the synchronization support of the present invention. As described in the background, when a synchronized access (i.e., synchronization mode of sync or future) is made to a word of memory, if the access is not successful, then the access will be retried a certain number of times. When the retry limit has been reached, the data blocked exception is raised. The data blocked trap handler can return to the trapped access operation to continue retrying the access. Alternatively, the thread that attempted to execute the trapped instruction can be blocked from further execution until access is or may be successful. For example, the blocked thread could be restarted after a certain time interval. If the access is still not successful, the data blocked trap handler can again block that thread. Alternatively, if multiple threads are blocked on a word of memory (i.e., waiting for access to that word of memory), then a single stream can be dedicated to retrying access to that word of memory. Once access is successful, then that single stream can restart the blocked threads.

A problem with these approaches to handling data blocked exceptions is that processor resources are consumed when determining whether a blocked thread may become unblocked. One aspect of the present invention provides a data blocked handling system that handles data blocked exception raised by a retry limit exceeded event without consuming any resources until an operation is performed that may allow a blocked thread to successfully access the blocking word of memory. Block 302 illustrates the state of a word of memory when an access may be unsuccessful. In this example, full/empty bit is empty. As a result, any access operation that specifies a future access mode or a load operation that specifies a sync access mode will be unsuccessful. The data blocked handling system includes a retry-limit trap handler and a trap 0 handler. When the retry limit is exceeded (e.g., when a load in sync access mode is attempted on word 302), the retry-limit trap handler sets the trap 0 enable bit of the blocking word 303 and blocks the thread from further execution until the blocking word is accessed. When the blocking word is next accessed, a data blocked exception is raised by a trap 0 event and the trap 0 handler is invoked. The trap 0 handler can then allow that access to proceed (i.e., performing a redo operation) and restart the blocked thread. When the blocked thread retries the access to the blocking word, the access may be successful and, if so, the thread continues its execution. If, however, the access is not successful, then a data blocked exception is again raised by a retry limit exceeded event. The retry limit trap handler would then again block that thread until another thread attempts to access the blocking word. Alternatively, the trap 0 handler can determine whether the access by the blocked thread would be successful and only restart the blocked thread when the access would be successful. Also, the trap 0 handler can complete the memory operation for the blocked thread rather than simply allowing it to re-attempt the operation.

In one embodiment, the retry-limit trap handler initializes a waiter data structure 304. The term "waiter" refers to a thread that is blocked waiting on a word of memory. The retry-limit trap handler stores state information of the blocked thread in a waiter data structure. The retry-limit trap handler also stores the value of the blocking word in the waiter data structure. The retry-limit trap handler then stores a pointer to the waiter data structure as the value in the blocking word 303. When the trap 0 handler is invoked when the blocking word is accessed, the trap 0 handler can locate the state information for the blocked thread using the value stored in the blocking word. If multiple threads become blocked on the word, then the trap 0 handler can create a linked list of waiter data structures 306 and 307. When the trap 0 handler determines that an access to the blocking word would have been successful and would have changed the state of the full/empty bit, then the trap 0 handler can determine which blocked threads are blocked on accesses that would now succeed. The trap 0 handler then restarts those block threads.

FIG. 4 contains a table illustrating whether access to a word of memory would be successful. The table 401 contains a load column and a store column. Each of these columns contain three sub-columns, one for each of the three synchronization access modes: normal, sync, and future. The table 401 contains a full row and an empty row. Each row contains two sub-rows. One sub-row indicates whether the operation will succeed and the other sub-row indicates the resulting value of the full/empty bit. The asterisk in the full/empty sub-rows indicate that the access will change the full/empty bit. For example, a load access in sync mode with the full/empty bit of the accessed word set to full will succeed and will change the full/empty bit to full. In contrast, a store access operation in sync mode to a word with its full/empty bit set to full will block and, of course, have no immediate effect on the full/empty bit.

Figure 5:
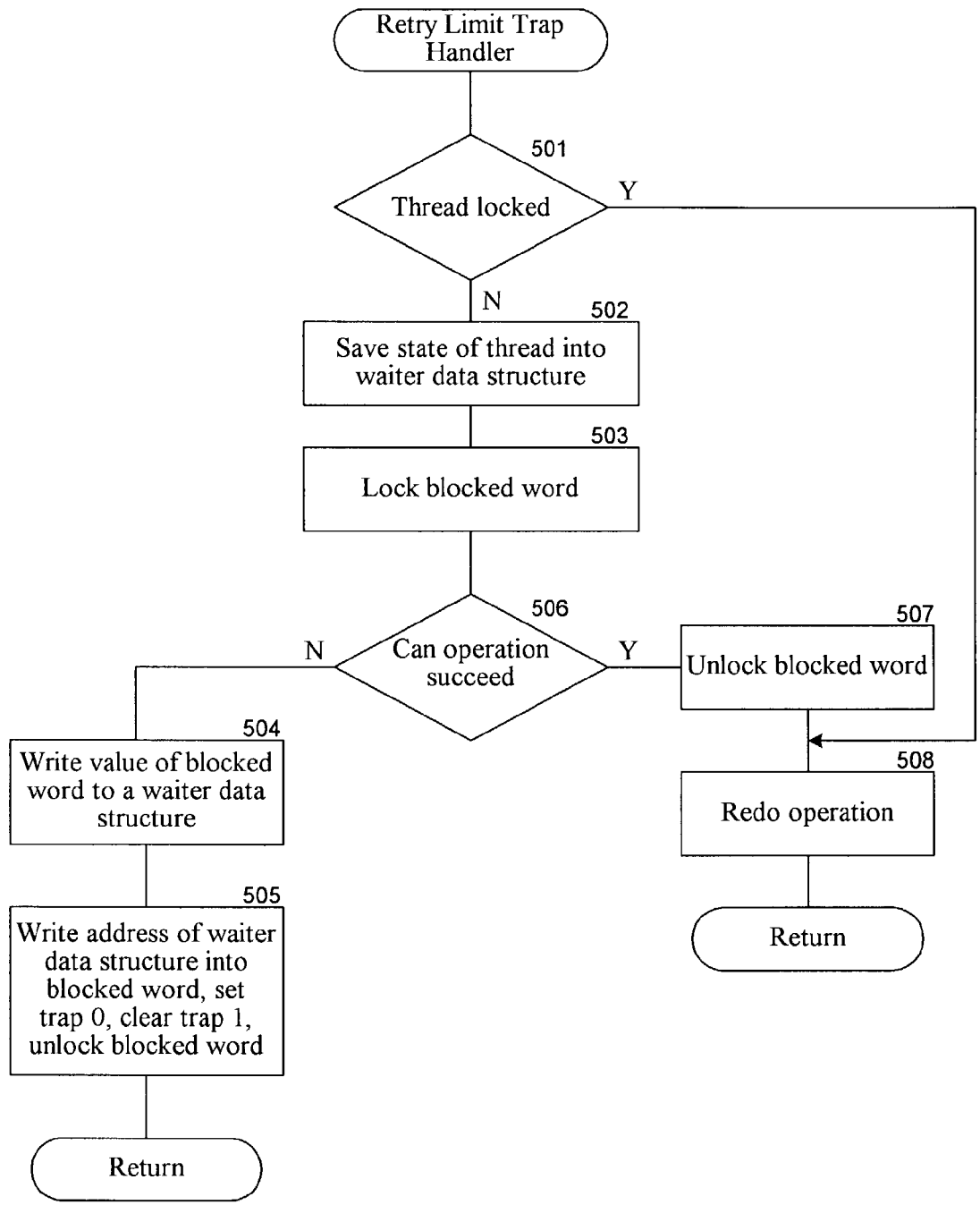
FIG. 5 is a flow diagram of an example retry-limit trap handler for synchronization support.

FIG. 5 is a flow diagram of an example retry-limit trap handler for synchronization support. In step 501, if the thread is locked, then the trap handler continues at step 508, else the trap handler continues at step 502. A stream executing a locked thread will not be assigned to another thread when the locked thread blocks. Rather, if the thread is locked, then the locked thread will continue to retry the access until it is successful (i.e., spin wait). In step 502, the trap handler saves the state of the thread into a waiter data structure. In step 503, the trap handler locks the blocking word. A word is locked by setting its full/empty bit to empty and setting the forward bit. Any access to a locked word will not be successful, unless the forwarding is disabled by the access control or unless the access is by an operation that ignores the access state of the word. In step 506, if the blocked operation can now succeed, then the trap handler continues at step 507, else the trap handler continues at step 504. Another thread may have accessed the blocked word in the interval between when the exception was raised and the blocked word was locked. Therefore, this check ensures that the thread is still blocked by checking the full/empty bit of the blocked word. In step 504, the trap handler writes the value of the blocked word to the waiter data structure. In one embodiment, the value of the blocked word is written to only one waiter data structure (e.g., the eldest waiter data structure in the list), rather than to each waiter data structure. In step 505, the trap handler writes the address of the waiter data structure into the blocking word. The trap handler also sets the trap 0 enable bit, clears the trap 1 enable bit, and unlocks the blocked word. This unlocks the blocking word and enables a trap 0 trap on the next access. The trap handler then returns so that another thread can be selected to execute on the stream. One skilled in the art would appreciate that the trap 1 could alternatively be used to detect access to the blocking word. In general, the use of trap 0 and trap 1, or both, are interchangeable. In step 507, the trap handler unlocks the blocked word. In step 508, the trap handler redoes the operation and continues executing the thread. A nested trap may occur when redoing an operation for a locked thread. So, in one embodiment, the nesting can be detected and area for saving the state of the trapping thread can be reused.

Figure 6:
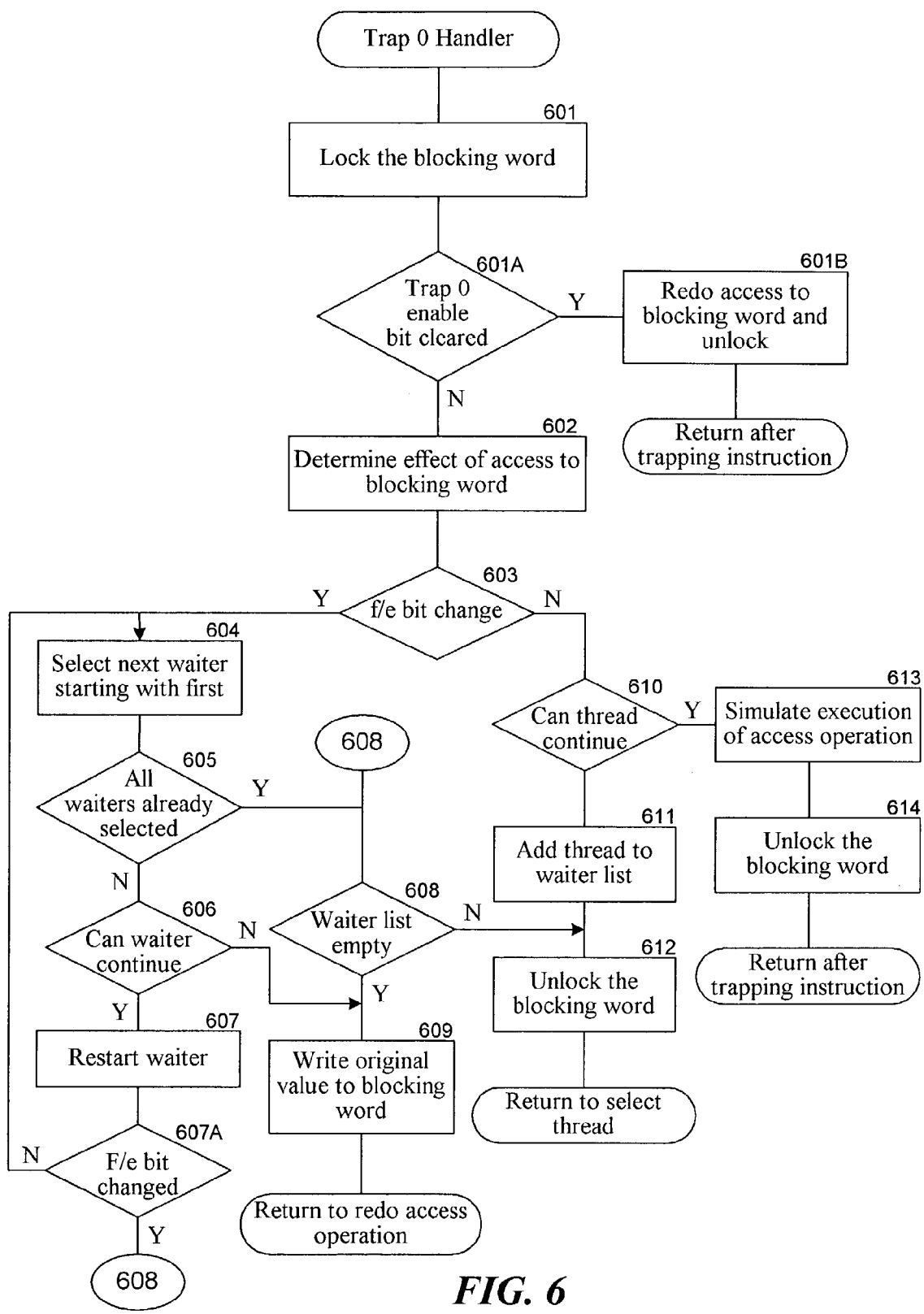
FIG. 6 is a flow diagram of an example trap 0 handler for synchronization support.

FIG. 6 is a flow diagram of an example trap 0 handler for synchronization support. In step 601, the trap handler locks the blocking word. In step 601A, if the trap 0 enable bit is cleared, then another thread has accessed the blocking word since the exception was raised for this thread and the trap handler continues at step 601B, else the trap handler continues at step 602. In step 601B, the trap handler redoes the trapping operation and returns to the thread after the trapping instruction. In step 602, the trap handler determines the effect of the access to the blocking word by accessing table 401. In step 603, if the full/empty bit would be changed by the access, then the trap handler continues at step 604, else the trap handler continues at step 610. In step 604, the trap handler selects the next waiter, starting with the eldest waiter. In step 605, if all the waiters are already selected, then the trap handler continues at step 608, else trap handler continues that step 606. In step 606, if the waiter can succeed with execution of its blocked operation as indicated by table 401, then the trap handler continues at step 607, else the trap handler loops to step 604 to select the next waiter. In step 607, the trap handler restarts the waiter. In step 607A, if the full/empty bit of the blocking word was changed by the restarted waiter, then no more waiters can continue and the trap handler continues at step 608, else the trap handler loops to 604 to select the next waiter. In step 608, if the waiter list is empty, then the trap handler continues at step 609, else the trap handler continues at step 612. In step 609, since no more threads are blocked on the blocking word, the trap handler writes the original value (or last value written to the blocking word) back to the blocking word and then returns to redo the access operation. In step 610, if the thread can succeed in executing its operation, then the trap handler continues at step 613, else the trap handler continues that step 611. In step 611, the trap handler adds the thread to the waiter list. In step 612, the trap handler unlocks the blocking word and returns to select another thread to execute on this stream. In step 613, the trap handler simulates the execution of the access operation. In step 614, the trap handler unlocks the blocking word and returns to the instruction after the trapping instruction. Alternatively, if the full/empty bit of the blocking word is full (step 603), then all waiters waiting for an operation with a synchronization access mode of future and waiting on a fetch and add operation with a synchronization mode of sync can have their operations redone and their streams restarted. The trap handler can then go directly from step 607 to step 608 because at most one waiter can continue.

Demand Evaluation

Figure 7:
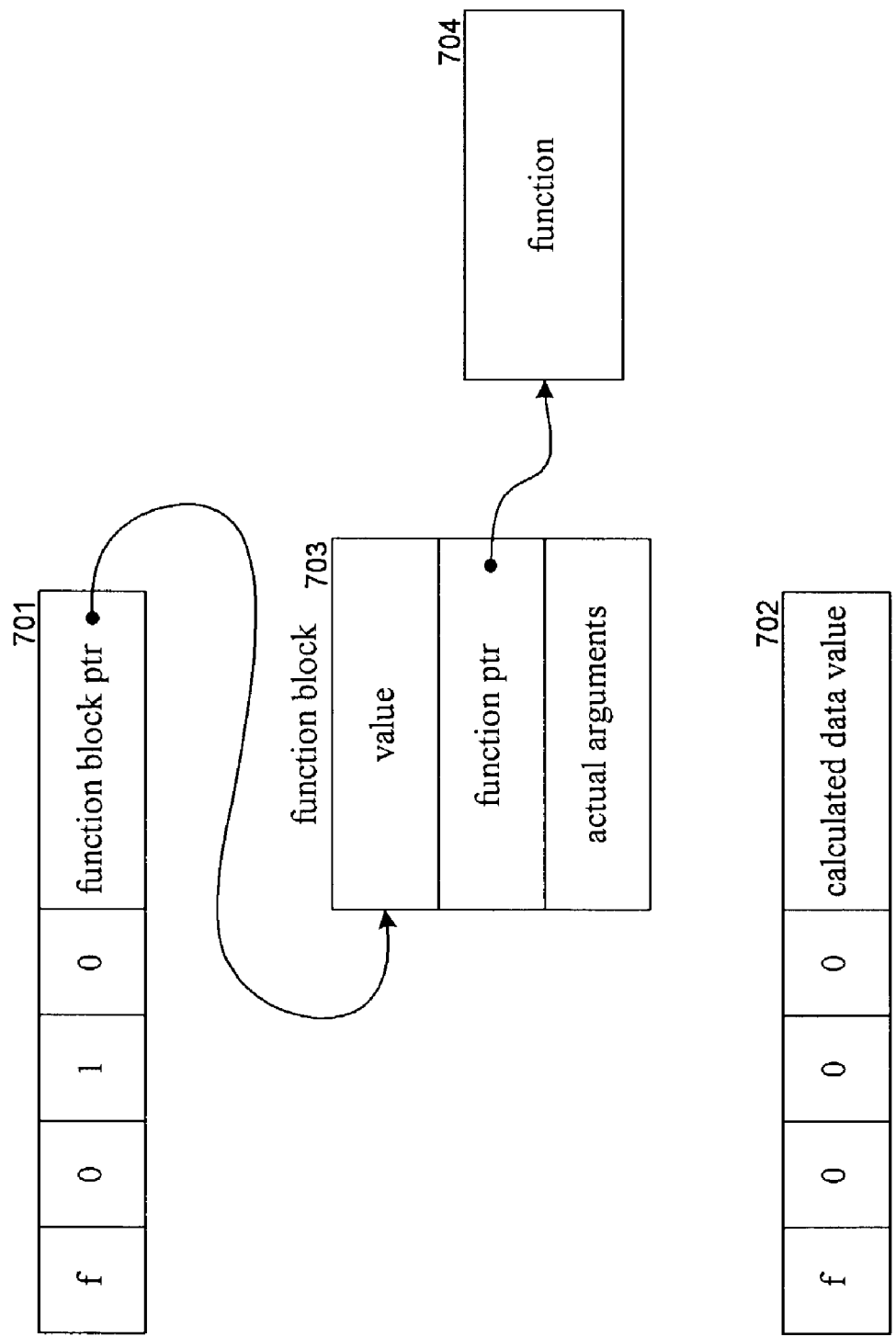
FIG. 7 is a block diagram illustrating demand evaluation techniques of the present invention.

FIG. 7 is a block diagram illustrating demand evaluation techniques of the present invention. Demand evaluation refers to the concept of deferring the calculation of a data value until there is a demand to access that data value. When an initial access is made to reference the data value, the demand evaluation technique then invokes a function to calculate that data value. The calculated data value is then returned as the result of the access, and the data value is made available for subsequent access without the need to re-execute the function. If the data value is never accessed, then the overhead of executing that function is avoided. In one embodiment, the initial access to the data value is detected by setting the trap 1 enable bit in a word of memory 701 where the data value should be stored. When that word of memory is accessed, the trap 1 handler is invoked. The trap 1 handler then executes a function to calculate the data value. The trap 1 handler then stores the calculated data value into the word of memory and clears the trap 1 enable bit 702. The trap 1 handler then performs a redo operation to complete the execution of the trapping operation. This redo operation retrieves the calculated data value from the word of memory 702. Since the calculated value is stored in the word of memory and the trap 1 enable bit is cleared, the next load operation to that word of memory will retrieve the calculated data value without raising an exception.

In one embodiment, the demand evaluation techniques store in the address portion of the word of memory 701 the address of the function block 703. The function block contains the previous value that was stored in the word of memory 701, a pointer to the function 704 that is to be invoked to calculate the data value, and the actual arguments to pass the function 704. When the trap 1 handler is invoked when the word of memory 701 is accessed, the trap handler uses that word of memory to locate the function block. If the access is to read the word of memory, then the trap 1 handler invokes the function passing the actual arguments. The function returns a calculated data value, which the trap 1 handler then stores in the word of memory 702. If the access is to write a value to the word of memory, then the trap 1 handler may recognize that access as an error. Alternatively, the value of the word of memory may be used as an argument that is passed to the function. Thus, the writing of a value to the word of memory would not cause an error. Rather, the writing of the value to the word of memory would result in the data value stored in the function block to be updated with the new value.

In addition to supporting demand evaluation, aspects of the present invention also support detecting access to "protected" memory and "uninitialized" memory. A protected memory location is one for which a fatal error should occur whenever that memory location is accessed. The access to protected memory can be detected by setting a trap enable bit in the protected word. The trap handler can then effect the fatal error. The same trap handler (e.g., trap 1 handler) can be used for demand evaluation and accesses to protected memory. To distinguish whether the trapping word is protected, rather than set up for demand evaluation, a distinguished value (e.g., zero) can be stored in the word. Alternately, any value not valid as a pointer can be used to denote protected memory. Once the trap handler detects this zero value, it will handle the trap as resulting from access of protected memory, rather than for a demand evaluation.

Access to uninitialized memory can be detected in a similar way. A different distinguished value (e.g., 1) can be in the uninitialized word. The trap handler will allow write access to an uninitialized memory location to succeed and will also clear the trap enable bit. The trap handler will indicate a fatal error if a read access is attempted to the uninitialized memory. Alternatively, rather than using a distinguished value, both the trap 0 enable bit and the trap 1 enable bit can be set to indicate that memory is uninitialized and the trap handler can detect that both bits are set. Also, rather than a distinguished value, a side data structure, such as a hash table, could be used to determine which memory locations have functions associated with them.

Figure 8:
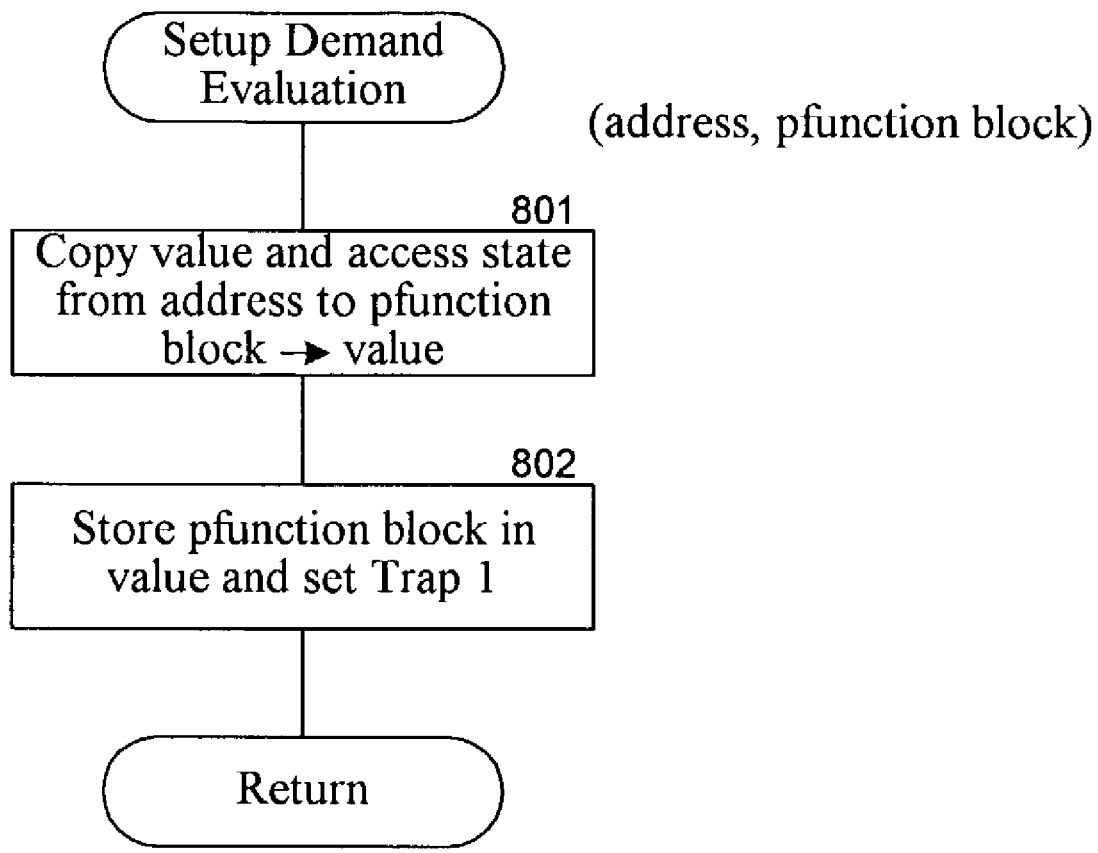
FIG. 8 is a flow diagram of an example routine to set up demand evaluation for a word of memory.

FIG. 8 is a flow diagram of an example routine to set up demand evaluation for a word of memory. This routine is passed the address of the word of memory along with a pointer to the function block which contains a pointer to the function along with the actual arguments to be passed to the function. In step 801, the routine copies the value and its access state from the addressed word of memory into the function block. In step 802, the routine stores the pointer to the function block into the value of the word of memory. The routine also sets the trap 1 enable bit. The routine then returns.

Figure 9:
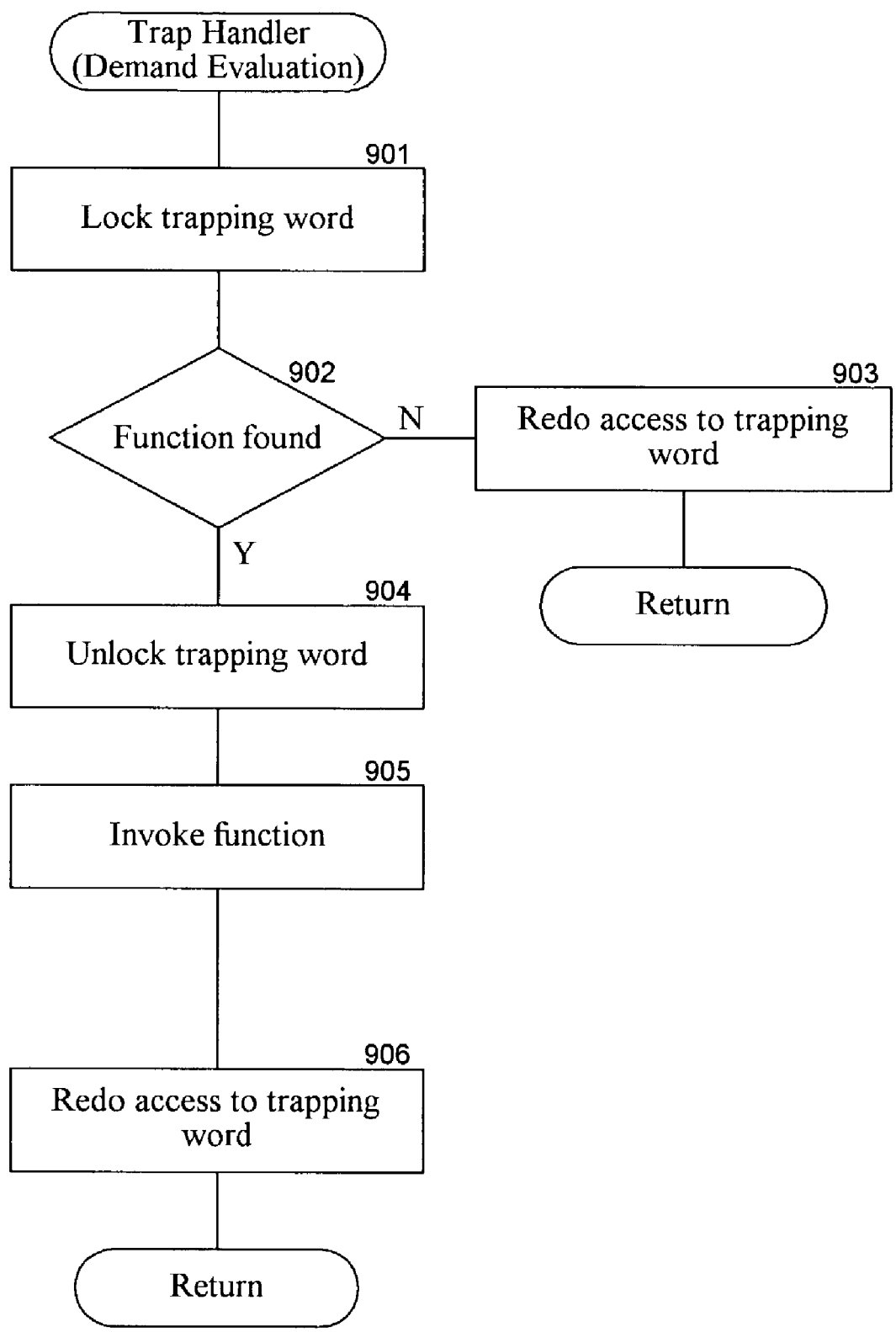
FIG. 9 is a flow diagram of an example trap handler for demand evaluation.

FIG. 9 is a flow diagram of an example trap handler for demand evaluation. In step 901, the trap handler locks the trapping word of memory. In step 902, if the function associated with the trapping word is not found (e.g., the trap enable bit has been cleared), then another stream has accessed the trapping word of memory since the data blocked exception was raised for this stream. That other stream has already invoked the function and stored the calculated data value in the trapping word. Therefore, if the function is not found, then the trap handler performs a redo operation to effect the access to the trapping word of memory in step 903 and returns. If, however, the function is found, then the trap handler continues at step 904. In step 904, the trap handler unlocks the trapping word. In step 905, the trap handler invokes the function referenced by the function block. The function is preferably re-entrant and safe to be executed by multiple threads in parallel. The invoked function stores the calculated value in the trapping word, clears the trap 1 enable bit and unlocks the trapping word. In step 906, the trap handler performs the redo operation to complete the access to the trapping word and then returns.

Figure 10:
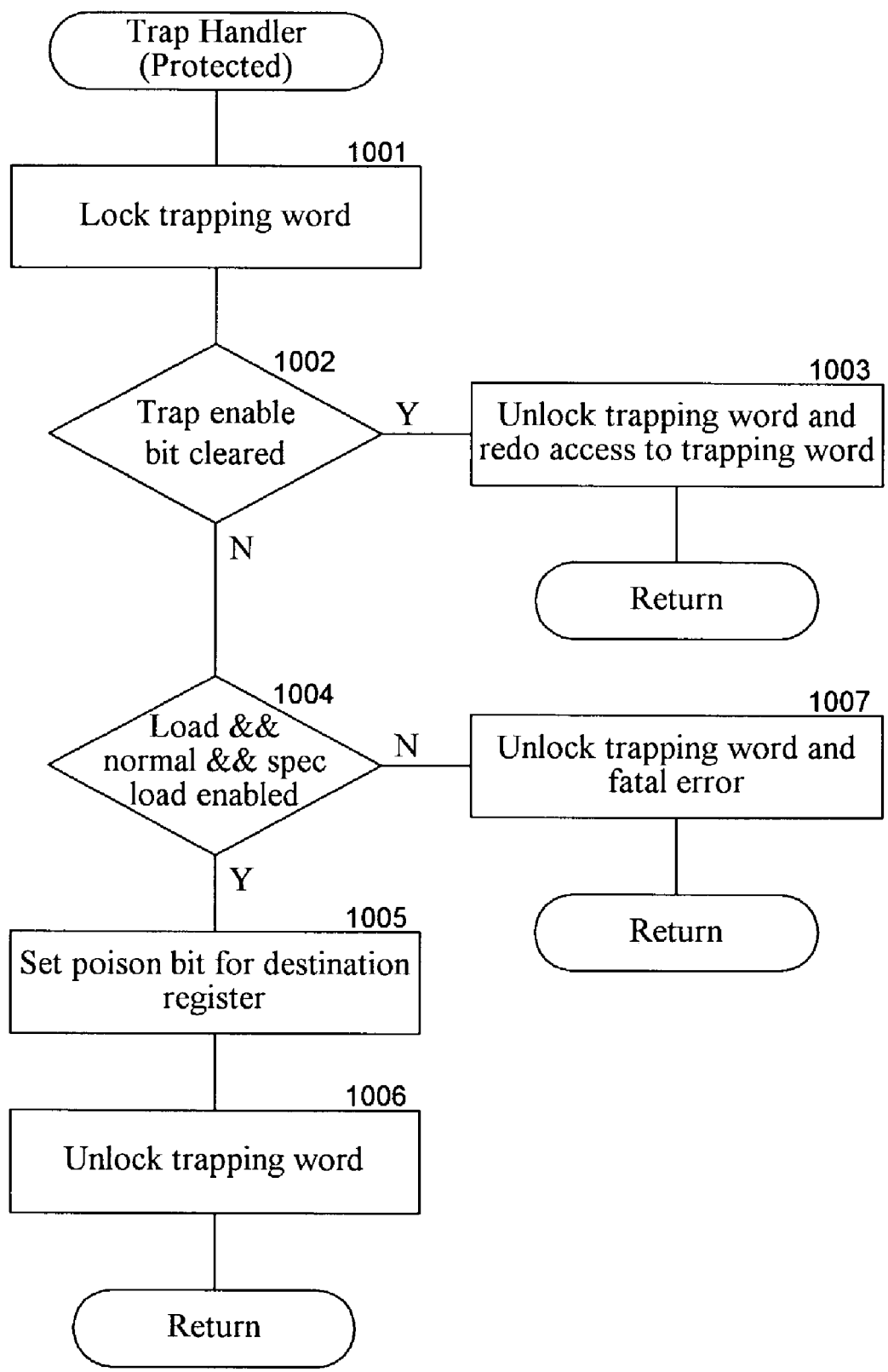
FIG. 10 is a flow diagram of an example trap handler for protected memory.

FIG. 10 is a flow diagram of an example trap handler for protected memory. In step 1001, the trap handler locks the trapping word of memory. In step 1002, if the trap enable bit has been cleared, then the trap handler unlocks the trapping word and performs a redo operation to affect the access to the trapping word of memory in step 1003 and returns, else the trap handler continues at step 1004. In step 1004, if the operation is a load, if the synchronization access mode is normal, and if speculative loads are enabled, then the routine continues at step 1005, else routine continues at step 1007. In step 1005, the trap handler sets the poison bit for the destination register. In step 1006, the trap handler unlocks the trapping word and returns. In step 1007, the trap handler unlocks the trapping word and reports the fatal error and returns.

Figure 11:
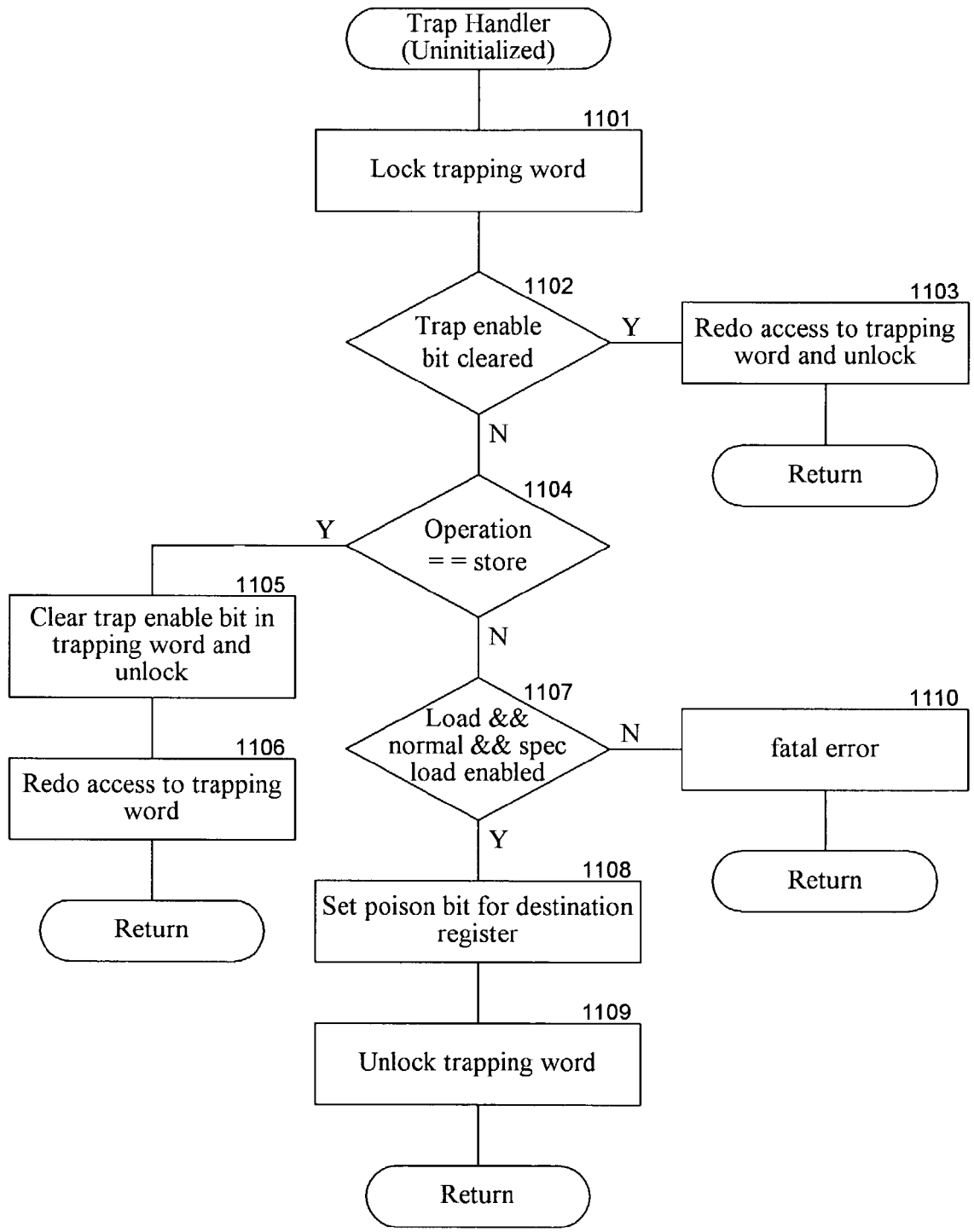
FIG. 11 is a flow diagram of an example trap handler for uninitialized memory.

FIG. 11 is a flow diagram of an example trap handler for uninitialized memory. In step 1101, the trap handler locks the trapping word of memory. In step 1102, if the trap enable bit has been cleared, then the trap handler unlocks the trapping word and performs a redo operation to effect the access to the trapping word of memory in step 1103 and returns, else the trap handler continues at step 1104. In step

1104, if the access operation is a store, then a trap handler continues at step 1105, else the trap handler continues at step 1107. In step 1105, the trap handler clears the trap enable bit and unlocks the trapping word In step 1106, the trap handler redoes the store access operation on the trapping word and returns. This redo operation stores the value in a trapping word. In step 1107, if the operation is a load, the synchronization access mode is normal, and speculative loads are enabled, then the routine continues at step 1108, else routine continues at step 1110. In step 1108, the trap handler sets the poison bit for the destination register. In step 1109, the trap handler unlocks the trapping word and returns. In step 1110, the trap handler unlocks the trapping word, reports the fatal error and returns.

Parallel List Access

Figure 12:
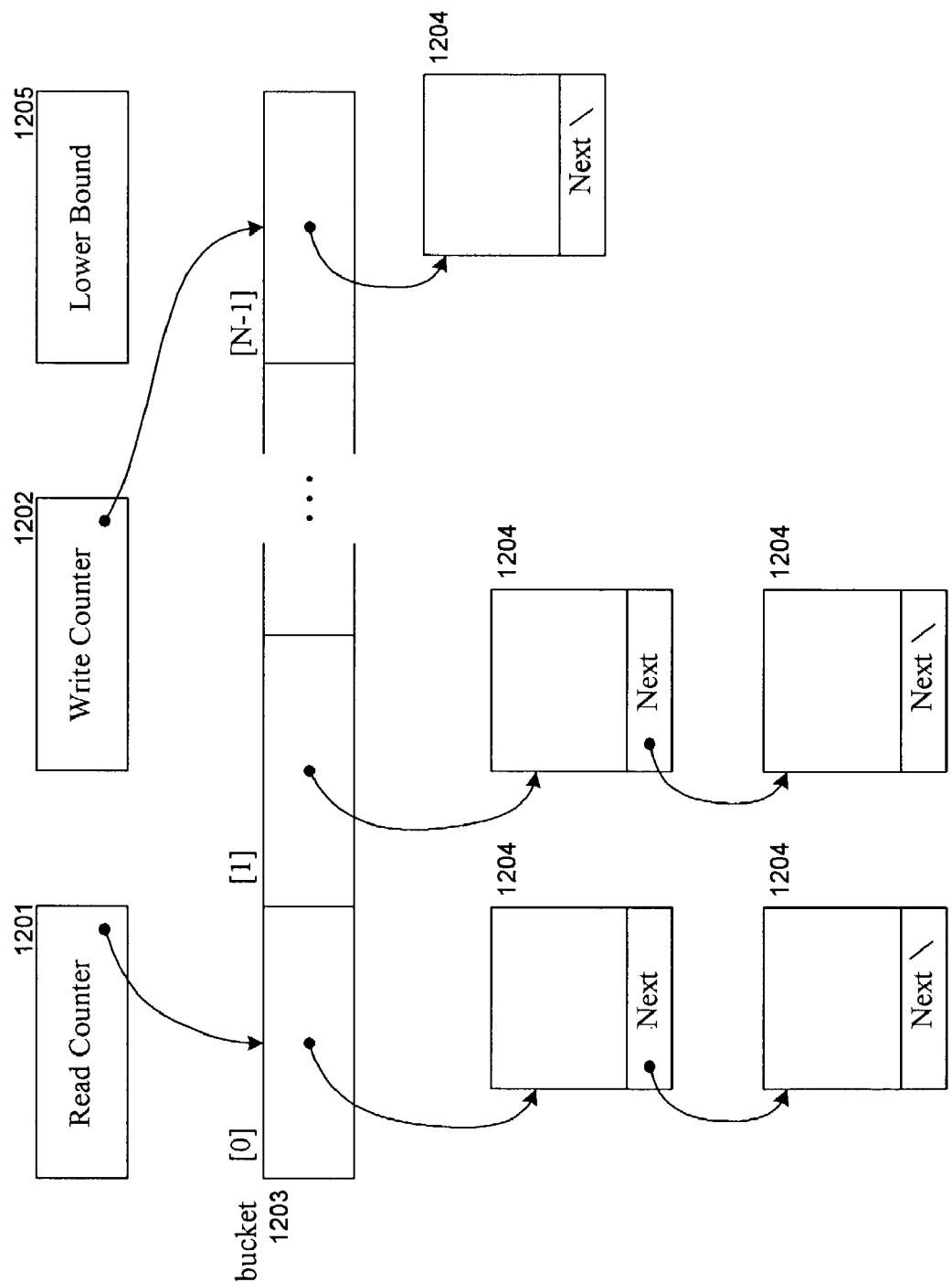
FIG. 12 is a block diagram illustrating a parallel access list.

The parallel list access techniques of the present invention allow multiple streams to add items to a list of items simultaneously without encountering synchronization problems. Typically, when an item is added to (or removed from) a list, one thread needs to place a lock on the list to prevent all other threads from accessing the list while the item is being added. After the item is added, the locking thread can then unlock the list to allow the next thread to access the list. Thus, even though parallel threads may be executing, access to the list is serial. To overcome this serial access problem, one embodiment of the present invention provides for list access in parallel. FIG. 12 is a block diagram illustrating a parallel access list. The parallel access list includes read counter 1201, write counter 1202, a lower bound 1205, bucket array 1203, and list items 1204. Each bucket in the bucket array contains a pointer to a linked list of items. Items are added to the linked lists of the bucket array in a circular manner. That is, the first item is added to the linked list of bucket[0], the second item is added to the linked list of bucket[1], and so on. Similarly, items are removed from the linked lists of the bucket array in a circular matter. The read counter points to the bucket from which the next item in the list is to be read. The write counter points to the bucket into which the next item is to be added. The lower bound indicates a lower bound on the number of items in the parallel list. That is, it is guaranteed that there will be at least the lower bound number of items in the list. If the lower bound is zero or negative, then there may not be any items in the parallel list. To add an item to the parallel list, a thread fetches and adds a 1 to the write counter. The thread then uses the remainder of the fetched write counter divided by the size of the bucket array (N) (i.e., fetched write counter modulo N) as the index into the bucket array. The thread then adds the item to the linked list of the indexed bucket and then fetches and adds to the lower bound. The next thread to add an item to a list will also fetch and add a 1 to the write counter, which selects next bucket in the array. Because the fetch and add operation is atomic, reduced contention is encountered when accessing the read or the write counter. Moreover, sequential write accesses to the parallel list will access sequential buckets, and the items can be added to the list without interference. If, however, the number of read or write accesses that have not yet completed exceeds the number of buckets in the array, then multiple threads may be accessing the linked lists of a bucket simultaneously. To prevent this simultaneous access, each bucket in the array is accessed in a synchronization mode of sync. Although contention can occur when the number of simultaneous write or read accesses exceeds the number of buckets or when a read access and a write accesses attempt to access the same bucket simultaneously, multiple access can be simultaneous without contention. Moreover, the number of buckets in the bucket array can be selected to help minimize the contention.

Figure 13:
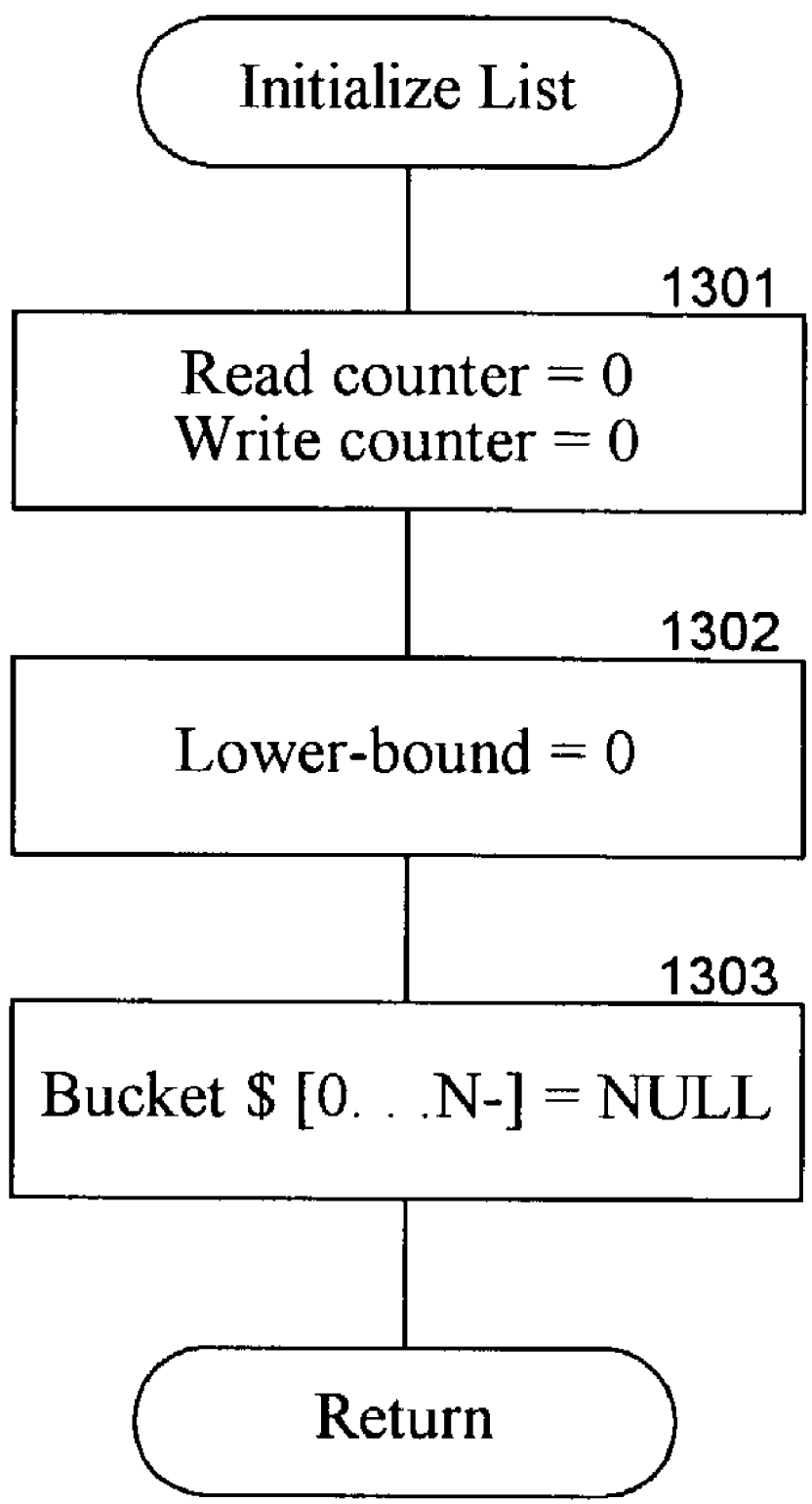
FIG. 13 is a flow diagram of an example initialize parallel list routine.

FIG. 13 is a flow diagram of an example initialize parallel list routine. The initialize parallel list routine initializes the parallel list to be empty. In step 1301, the routine sets the read and write counters to zero. In step 1302, the routine sets the lower bound to zero. In step 1303, the routine sets each bucket in the array to a NULL value and sets its full/empty bit to full. A NULL value signifies the end of a linked list if a read or a write traverses the linked list. The routine then returns.

Figure 14:
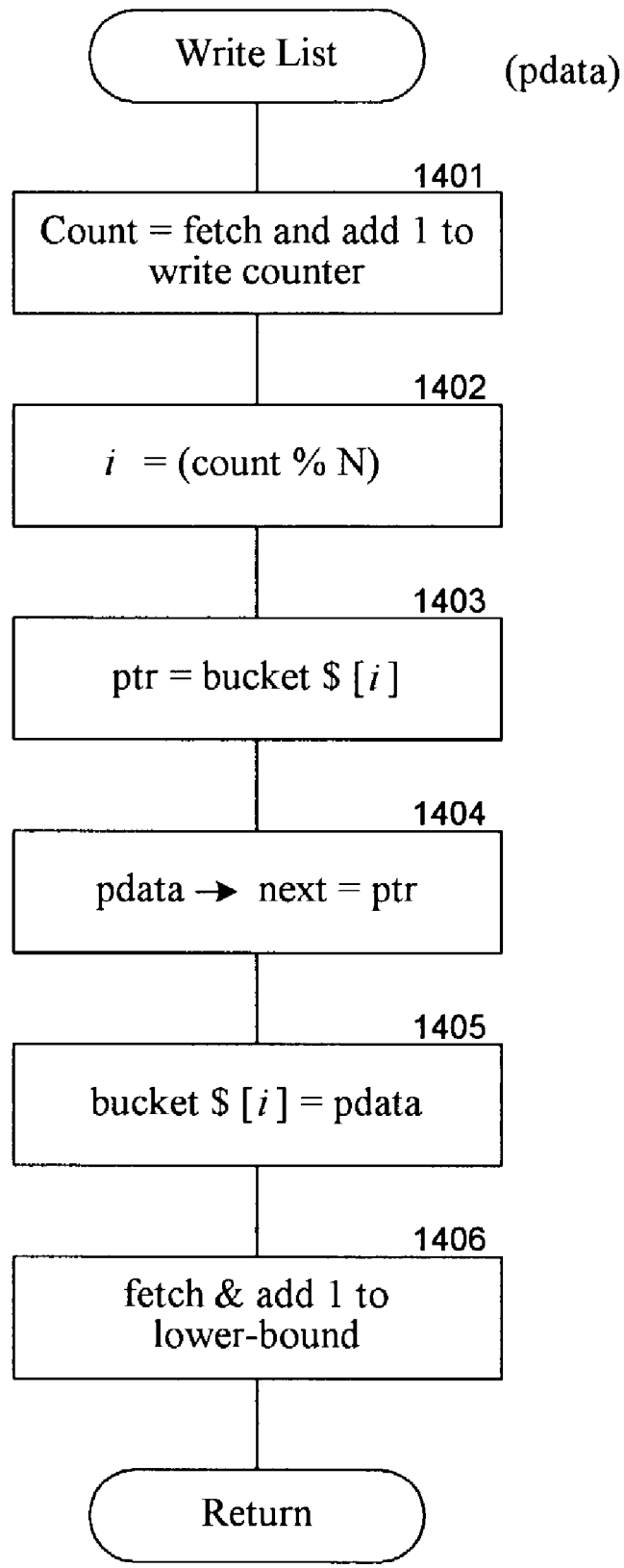
FIG. 14 is a flow diagram of an example write parallel list routine.

FIG. 14 is a flow diagram of an example write parallel list routine. This routine is passed an item to be added to the list and adds the passed item to the parallel list. In step 1401, the routine fetches and adds a 1 to the write counter. In step 1402, the routine sets the bucket array index (i) to the fetched write counter modulo the size of the bucket array (N). In step 1403, the routine retrieves the pointer stored in the indexed bucket. This read of the indexed bucket is with a synchronization mode of sync. That is, if the full/empty bit of the bucket is set to empty, then the read will block. The full/empty bit of the bucket will be set to empty if another item is in the process of being added to or removed from the list by another thread. When the full/empty bit is set to full, then the read will succeed and the full/empty bit is then set to empty to block simultaneous access to that bucket by another thread. In step 1404, the routine sets the next pointer in the passed item to the retrieved pointer. In step 1405, the routine sets the indexed bucket to point to the passed item, which sets the full/empty bit to full. Steps 1403 and 1405 effect looking and unlocking of the bucket. In step 1406, the routine fetches and adds to the lower bound. The routine then returns.

Figure 15:
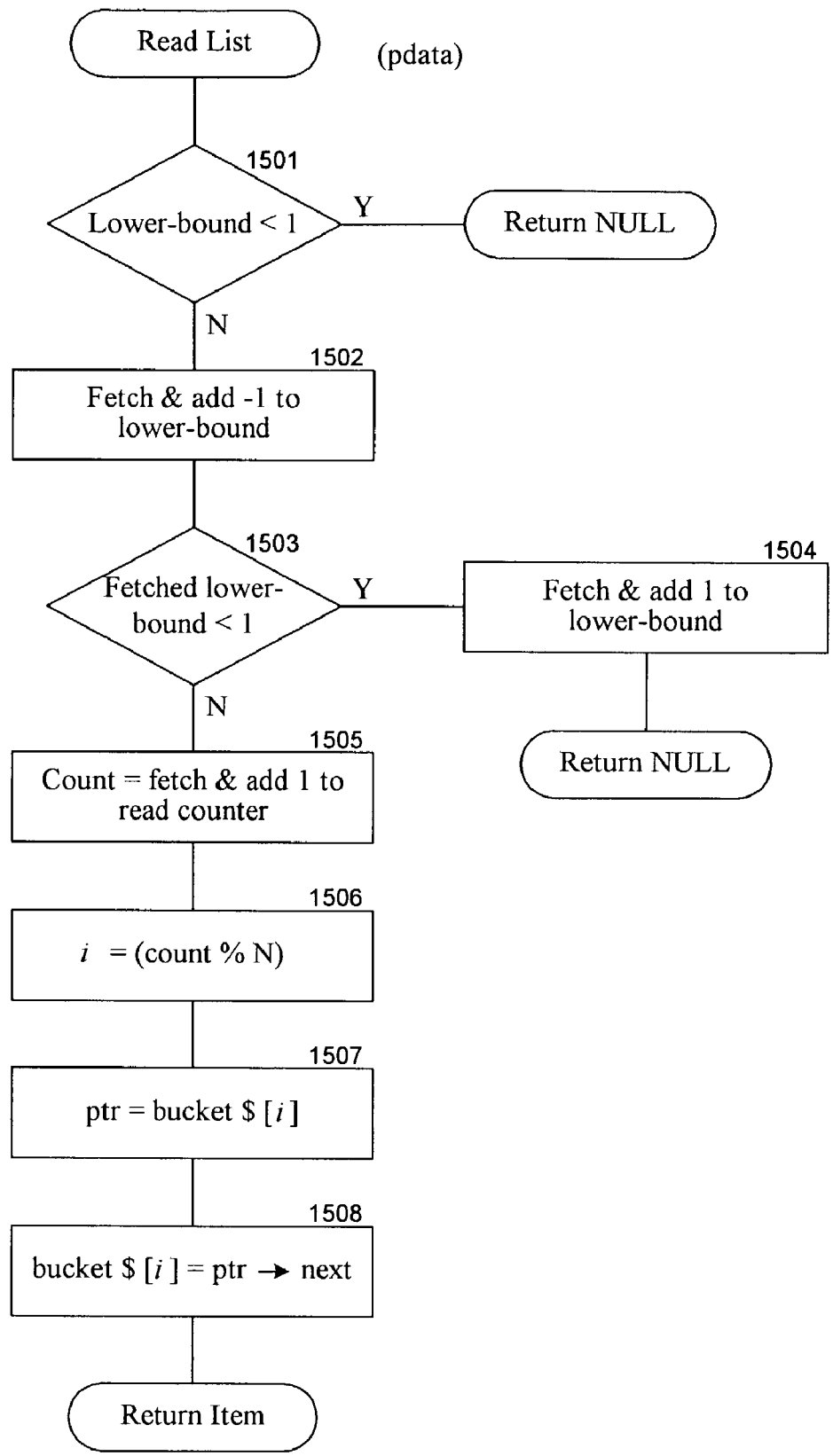
FIG. 15 is a flow diagram of an example read parallel list routine.

FIG. 15 is a flow diagram of an example read parallel list routine. This routine returns a pointer to an item removed from the parallel list or returns a NULL value if the lower bound is less than 1. The routine first checks the lower bound to determine whether the lower bound is less than 1. If so, the routine returns an indication that the parallel list is empty. If not, then there is at least one item in the parallel list. The routine then fetches and adds a −1 to the lower bound. If another thread had added a −1 to the lower bound in between the checking and fetching and adding by this thread, then the fetched lower bound may be less than 1. If so, the routine adds a 1 back to the lower bound and returns an indication that the parallel list is empty. Otherwise, the parallel list is not empty and the routine retrieves and returns an item. The first check for a lower bound less than 1 prevents starvation from multiple readers when a new item is added to an empty parallel list. Without this first check, the fetch and add of the lower bound may always be less than 1 for each of the multiple readers and thus no reader would recognize that an item has been added to the parallel list. The first check ensures that once the lower bound is less than 1, all the fetches and adds of 1 followed by fetches and adds of −1 will complete and at least one thread will recognize a lower bound of 1 and one thread will perform a fetch and add that returns the 1. In step 1501, if the lower bound is less than 1, then the routine returns an indication that the parallel list is empty, else the routine continues at step 1502. In step 1502, the routine fetches and adds a −1 to the lower bound. In step 1503, if the fetched lower bound is less than 1, then the routine fetches and adds a 1 to the lower bound in step 1504 and returns an indication that the parallel list is empty, else the routine continues at step 1505. In step 1505, the routine fetches and adds a 1 to the read counter. In step 1506, the routine sets the bucket array index (i) to the fetched read counter modulo the size of the bucket array (N). In step 1507, the routine retrieves the pointer stored in the indexed bucket. This reading of the indexed bucket is with a synchronization mode of sync. That is, if the full/empty bit of the bucket is set to empty, then the read will block until it is set to full. In step 1508, the routine sets the indexed bucket to the next pointer of the pointed to item which sets the full/empty bit to full and returns the pointed to item. Steps 1507 and 1508 effect locking and unlocking of the bucket. Alternatively, the routine can traverse the linked list and return the last item in the linked list if desired or a doubly linked list may be used rather than a singly linked list. Also, rather than a linked list, any other type of data structure can be used such as a binary tree or a hash table.

Data Buffering

The data buffering techniques of the present invention allows for multiple-producer and multiple-consumer accessing of a data buffer. The data buffering techniques provide for unsynchronized access and for synchronized access to the data buffer. With unsynchronized access, there is no consumer and data can be overwritten by the producers. With synchronized access, producers cannot overwrite data until it is consumed. The data buffer has a read pointer and a write pointer. By setting the synchronization access mode to normal or sync in the pointers, the access to the data buffer can be switched from unsynchronized to synchronized without modifying the accessing programs. When the access is unsynchronized, then a producer may overwrite existing data unless the producer implements a scheme for checking the read pointer. However, if the access is synchronized, then the producer cannot overwrite existing data and can avoid checking the read pointer. Thus, the desired behavior depends on whether it is acceptable to overwrite data that has not yet been read and can be controlled by the pointers with modification to the accessing code.

The data buffering technique also provides a mechanism in which the accessing programs need not include code for detecting the end of the buffer. Traditionally, when circular buffers are accessed, the accessing program needs to check for the end of the circular buffer and if at the end, wrap around the beginning of the circular buffer. With this data buffering technique however, such checking for the end of the buffer is not necessary. To avoid this checking, the data buffering technique sets the forward bit in the words following the end of the data buffer and stores a pointer in those words that point to the words at the beginning of the data buffer. For example, the first word following the end of the data buffer is set to point to the first word of the data buffer, the second word following the end of the data buffer is set to point to the second word of the data buffer, and so on. Since the forward bit is set in these words, any access to these words will be forwarded to the beginning of the data buffer. For example, if a program starts writing a block of data into the data buffer near the end of the data buffer, the first few words are added at the end of the buffer. When the remaining words are added to the locations past the end of the data buffer, the forward bit directs the access to the words at the beginning of the data buffer. In this way, the accessing program can avoid checking for an end of the data buffer condition so long as the amount of data to be added to the data buffer is less than the number of forwarding words adjacent to the end of the data buffer. If the amount of data in a block to be added is greater than the number of forwarding words, then a check for the end of the buffer is needed for all such blocks.

Figure 16:
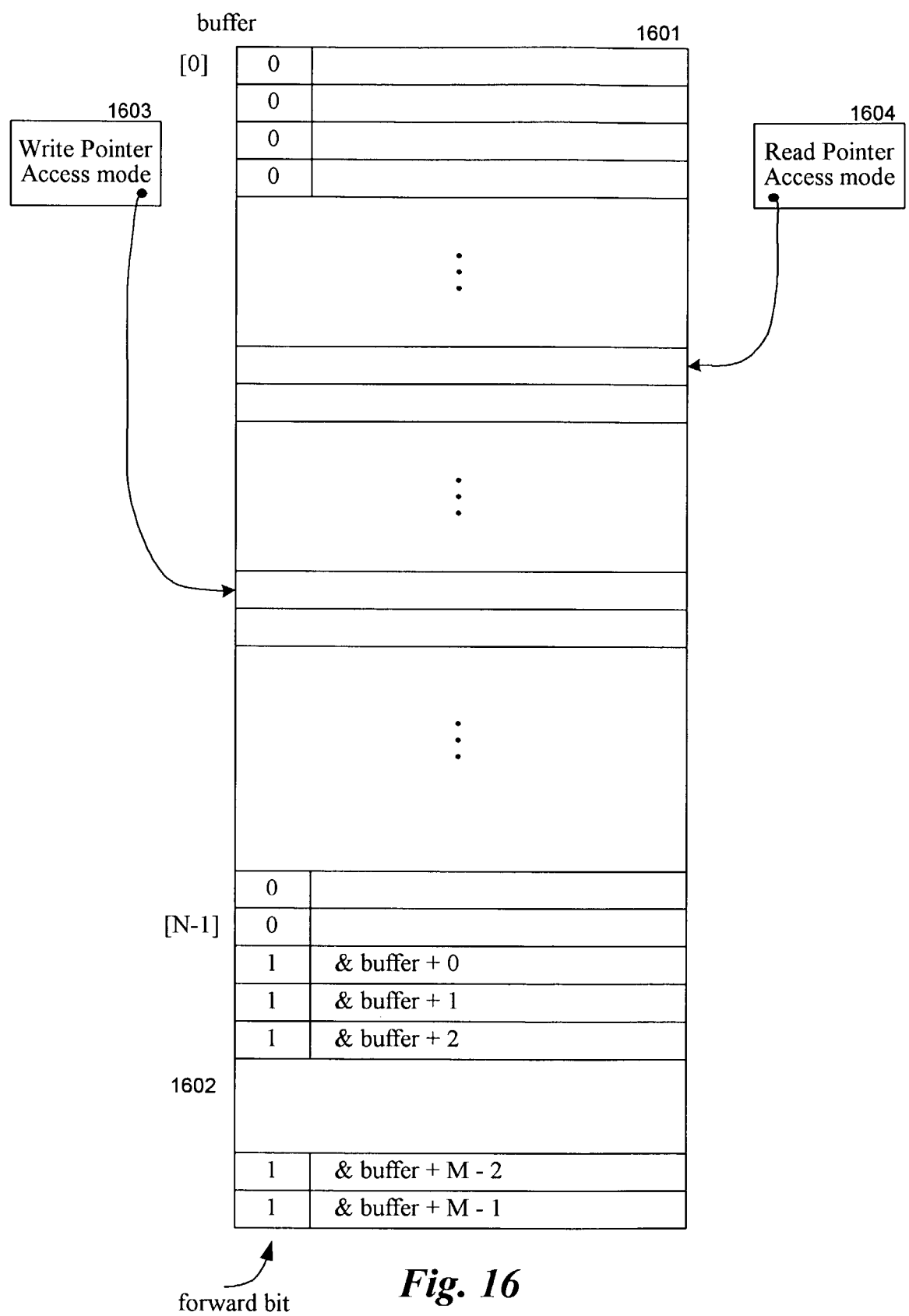
FIG. 16 is a block diagram illustrating the buffering techniques of the present invention.

FIG. 16 is a block diagram illustrating the buffering techniques of the present invention. The buffer 1601 contains words with their forward enable bit cleared. However, the forwarding words 1602 adjacent to the end of the buffer have their forward enable bits set. The first forwarding word contains a pointer to the first word of the buffer, the second forwarding word contains a pointer to the second word of the buffer, and so on. The write pointer 1603 and the read pointer 1604 are used to access the buffer and have their synchronization access node set to normal or sync.

Figure 17:
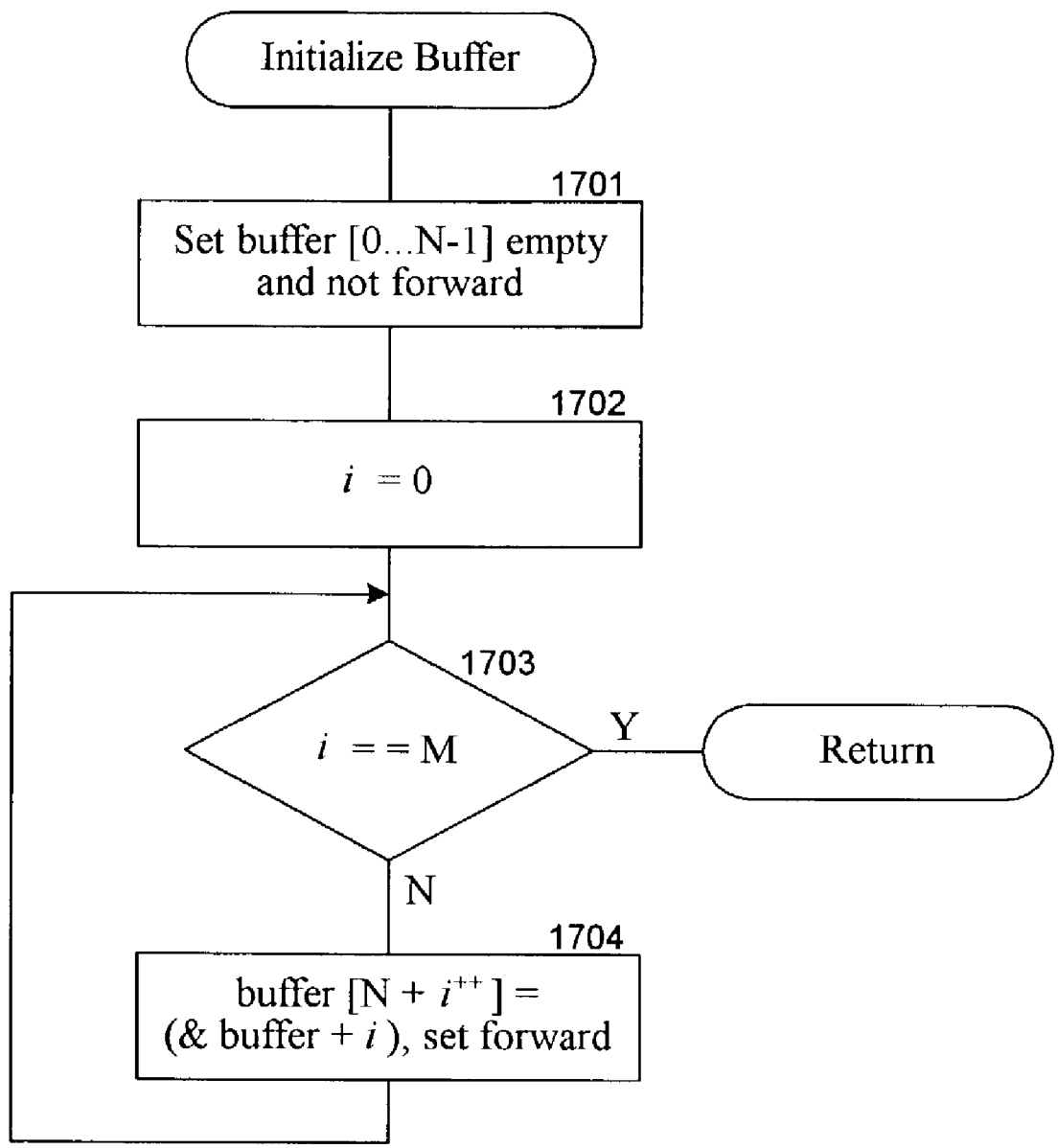
FIG. 17 is a flow diagram of an example routine for initializing the buffer.

FIG. 17 is a flow diagram of an example routine for initializing the buffer. In step 1701, the routine clears the forward enable bit and sets the full/empty bit to empty for each word in the buffer. In steps 1702–1704, the routine loops setting the forwarding words adjacent to the end of the buffer. In step 1703, the routine initializes the index (i) to zero. In step 1703, if the index is equal to the number of forwarding words (M), then the routine returns, else the routine continues at step 1704. In step 1704, the routine sets a forwarding word to point to the indexed word in the buffer and sets the forward enable bit. The routine then loops to step 1703 to select the next forwarding word.

Figure 18:
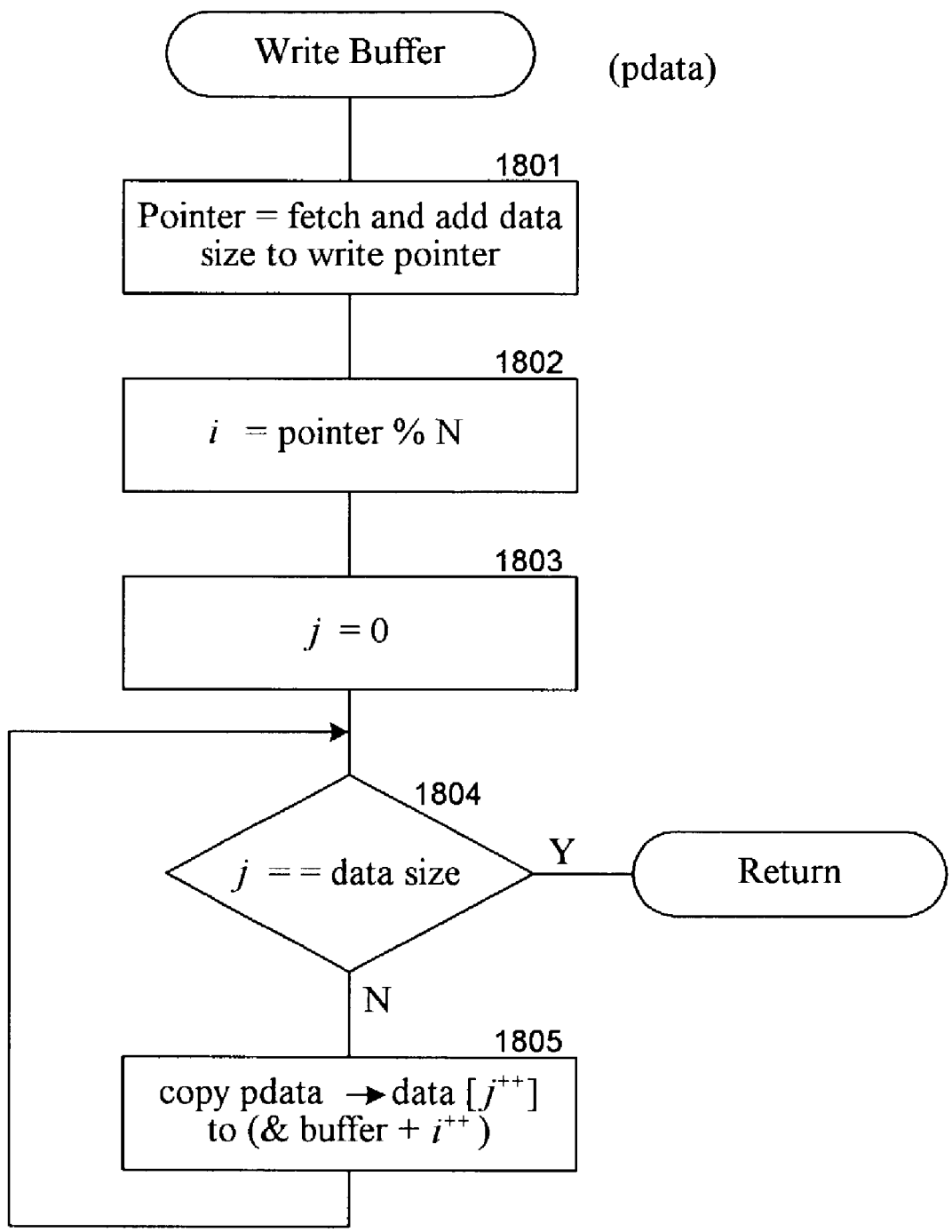
FIG. 18 is a flow diagram of an example write buffer routine.

FIG. 18 is a flow diagram of an example write buffer routine. This routine is passed a block of data of an arbitrary size that is to be added to the buffer. This example routine assumes that the arbitrary size is less than the number of forwarding words at the end of the buffer and that the number of outstanding writes is less than the size of the buffer so that subsequent writes do not write past a word whose previous write has not yet completed. In step 1801, the routine fetches and adds the data size of the block of data to the write pointer. This fetching and adding adjusts the write pointer so that another thread can also fetch and add to the write pointer and simultaneously be adding a data block to the buffer. In step 1802, the routine sets the index (i) to the remainder of the fetched pointer divided by the size of the buffer (N). In steps 1803–1805, the routine loops copying the block of data to the buffer starting at the index. In step 1803, the routine initializes an index (j) into the block of data. In step 1804, if the index into the block of data is equal to the size of the block of data, then the routine returns, else the routine continues at step 1805. In step 1805, the routine copies the indexed (j) word of the block of data to the buffer at the indexed (i) location using the access control mode of the fetched pointer. The routine also increments the index (i) and the index (j). If the index (i) into the buffer points past the end of the buffer, that is into the forwarding words, then the copying is forwarded to the beginning of the buffer. The routine then loops to step 1804. In this way, a test for the end of buffer during or before the copying loop is avoided. Since the write pointer was incremented by the data size of the block, the write pointer will correctly point to the location immediately after the added data, near the beginning of the buffer. Also, the indexes could have the address of the buffer and the data block added to them once to once to avoid the addition of these addresses for each word being copied.

Figure 19:
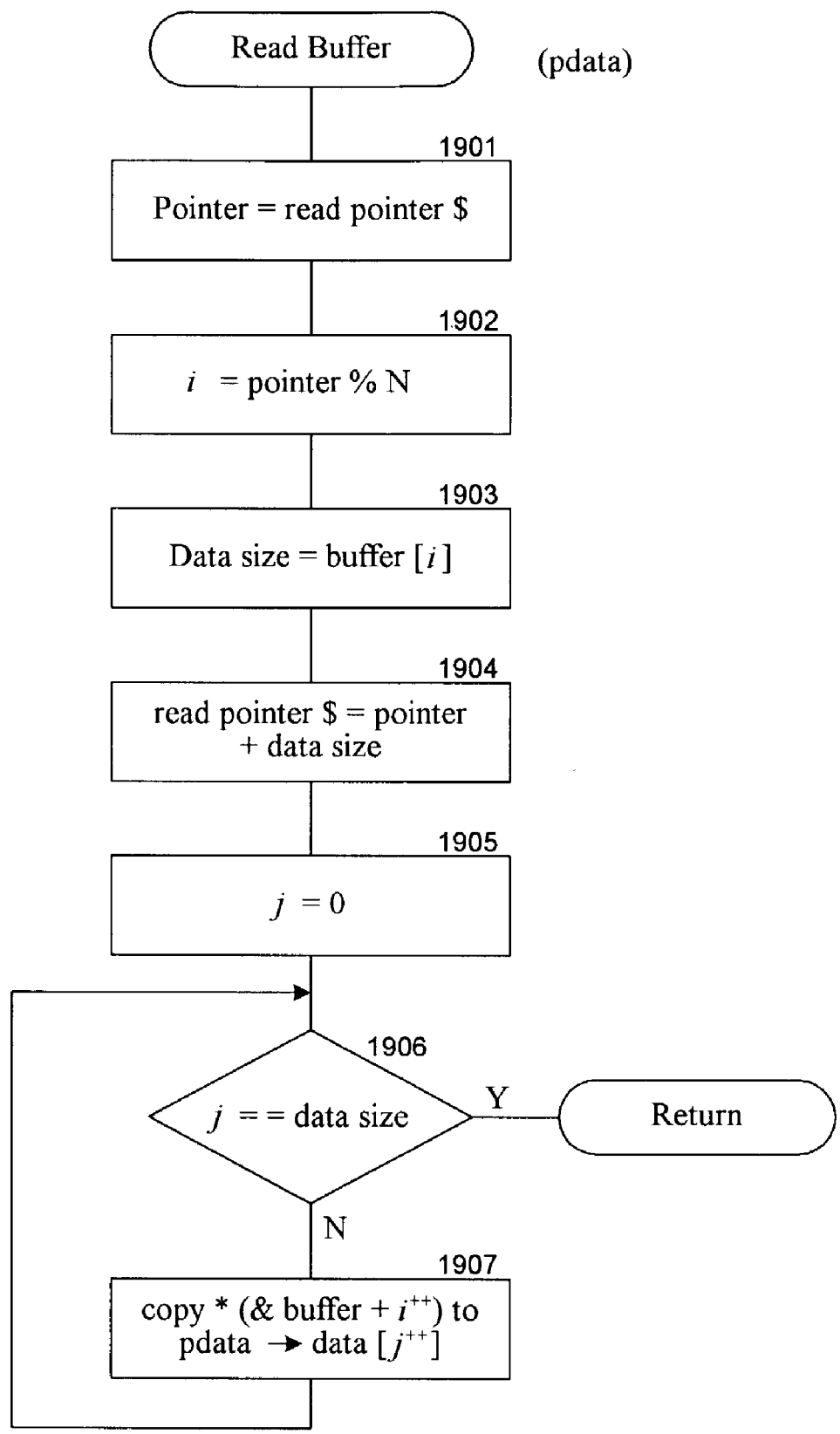
FIG. 19 is a flow diagram of an example read buffer routine.

FIG. 19 is a flow diagram of an example read buffer routine. This routine returns a pointer to the block of data that has been read from the buffer. This routine assumes that the size of a block of data is stored as the first word of the block. Since the size is not known in advance of reading the block, a fetch and add will be insufficient to prevent simultaneous read access to the block. To prevent simultaneous access, the read pointer is accessed with a synchronization access mode of sync. In step 1901, the routine retrieves the read pointer. In step 1902, the routine sets the index (i) into the buffer to the remainder of retrieved pointer divided by the size of the buffer (N). In step 1903, the routine retrieves the data size from the buffer. In step 1904, the routine increments the read pointer by the data size. In steps 1905–1907, the routine loops copying the data from the buffer. In step 1905, the routine sets the index (j) into the data block to zero. In step 1905, if the index (j) into the data block is equal to the size of the data, then the routine returns, else the routine continues at step 1907. In step 1907, the routine copies data from the buffer at the indexed location to the data block to be returned. The data is retrieved from the buffer using the access control mode of the read pointer. The routine also increments the index (i) into the buffer and index (j) into the data block. The routine then loops to step 1906.

Sentinel Words

Figure 20:
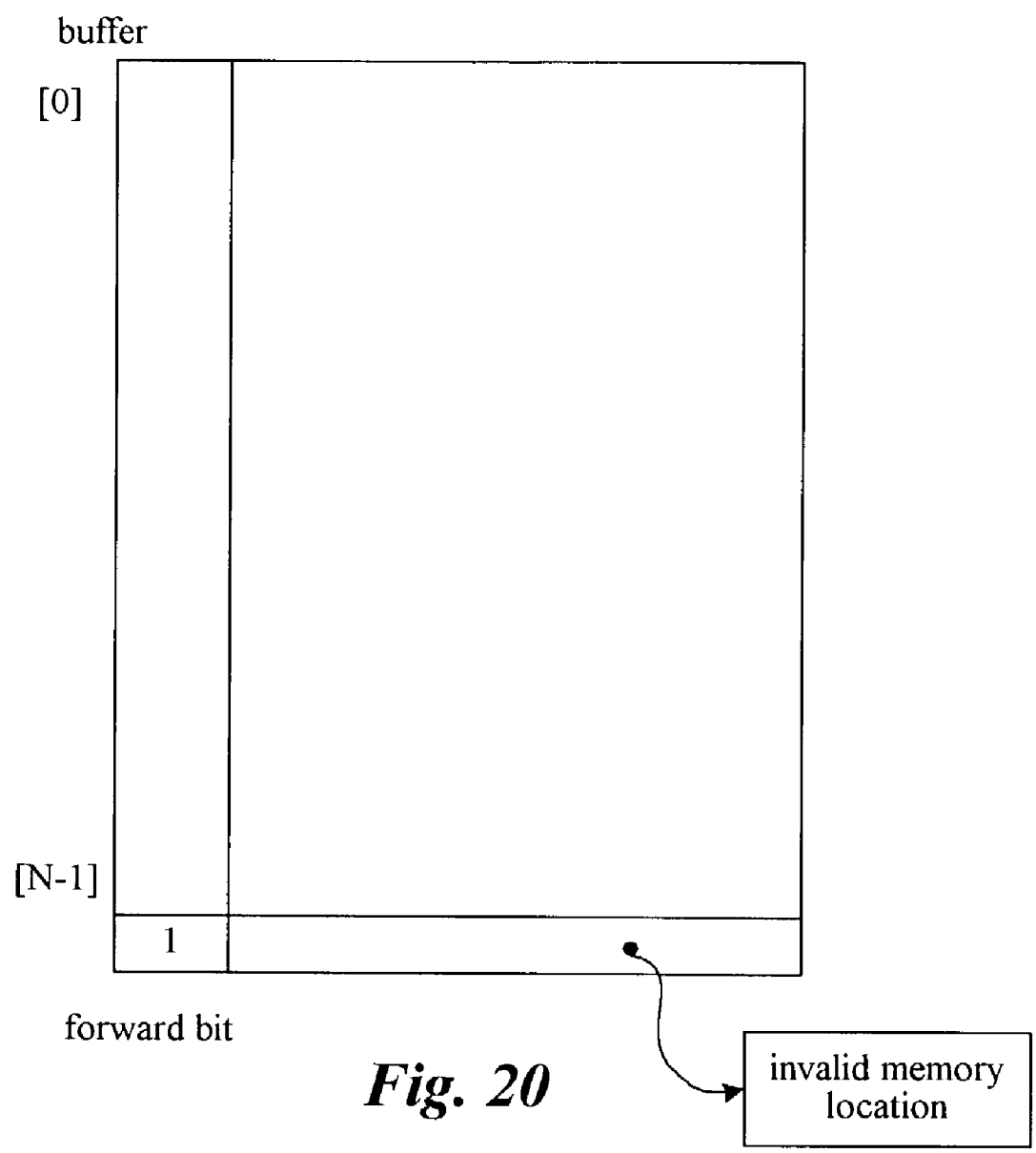
FIG. 20 illustrates the positioning of a sentinel word past an end of a buffer.

The sentinel word technique of the present invention provides a mechanism for checking errant program writes past the end of or the front of a buffer. The sentinel word has its forward enable bit set and contains a pointer to an invalid memory location, such as the location at address 0. When a program attempts to write to a sentinel word, a data protection exception is raised and a trap occurs. When a program attempts to read the sentinel word when speculative loads are enabled, because the memory location is invalid, the poison bit corresponding to the destination register is set. An exception is thus not raised until an attempt is made to use the value in the destination register. Thus, the sentinel word will allow speculative loads to work efficiently. If, however, the sentinel word had a trap enable bit set in order to detect access to the sentinel word, then a compiler-generated speculative load would cause an extra trap, which is undesirable. FIG. 20 illustrates the positioning of a sentinel word past the end of a buffer. As long as the access control mode used to access the buffer does not disable forwarding, the access to the sentinel word can be detected.

Observer Thread

Figure 21:
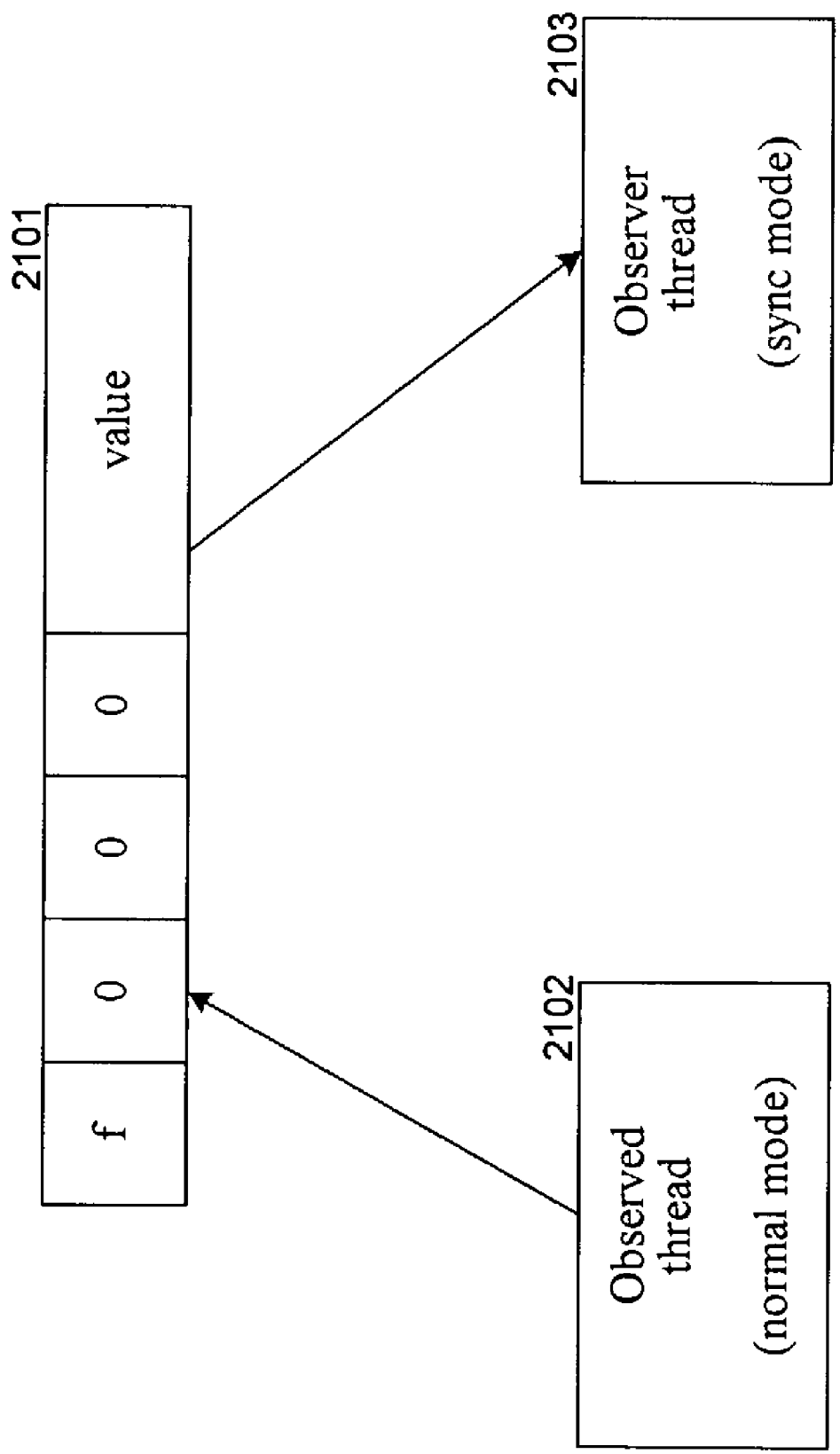
FIG. 21 is a block diagram illustrating the observed thread and the observer thread.

The observer thread technique of the present invention allows an observer thread to determine when an observed thread has written a value to a memory location. The observed thread writes to the memory location with a synchronization access mode of normal. The observer thread reads from the memory location with a synchronization access mode of sync. Whenever the observed thread writes a value to the word, the full/empty bit of the word is set to full. The observer thread reads that memory location with a synchronization access mode of sync. The observer thread will block until the full/empty bit of the word is set to full. When the full/empty bit is eventually set to full, the observer thread will become unblocked and read the value out of the word, which sets the full/empty bit to empty. The observer thread can then take some action based on the read value. FIG. 21 is a block diagram illustrating the observed thread and the observer thread. The memory location 2101 has its full/empty bit set to full whenever the observed thread 2102 stores a value in the memory location. The observer thread 2103 reads from that memory location with a synchronization access mode of sync, which sets the full/empty bit to empty, and then issues another read to observe the next change in value.

Figure 22:
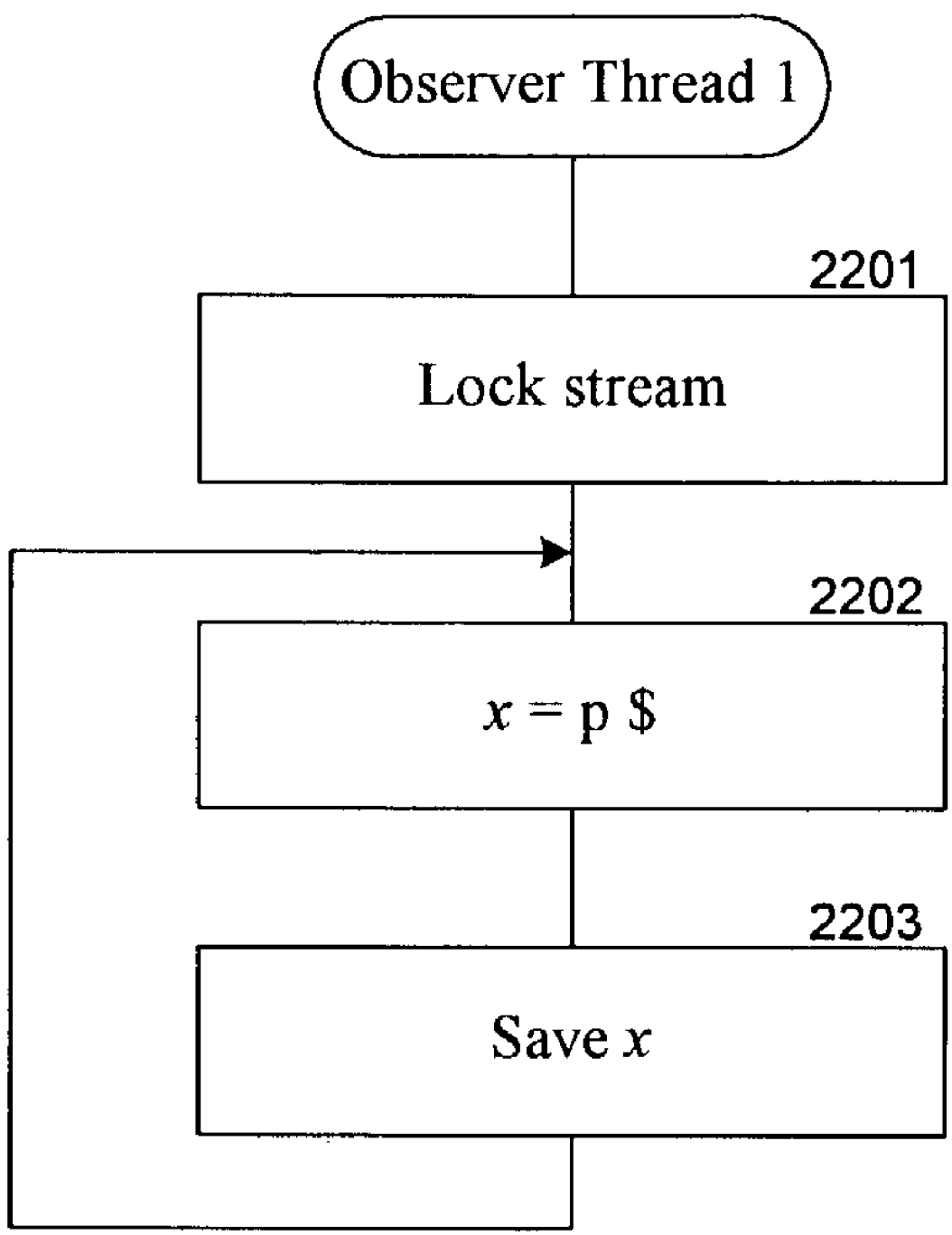
FIG. 22 is a flow diagram of one embodiment of the observer thread.

FIG. 22 is a flow diagram of one embodiment of the observer thread. In this embodiment, the observer thread blocks on the memory location waiting for the full/empty bit to be set to full. In step 2201, the observer thread locks the stream, which means that no other thread will be allowed to execute on the stream when a data block occurs. In step 2202, the observer thread issues a read with a synchronization access mode of sync to the memory location. In step 2203, the routine saves the read value and loops step 2202 to issue the next.

Figure 23:
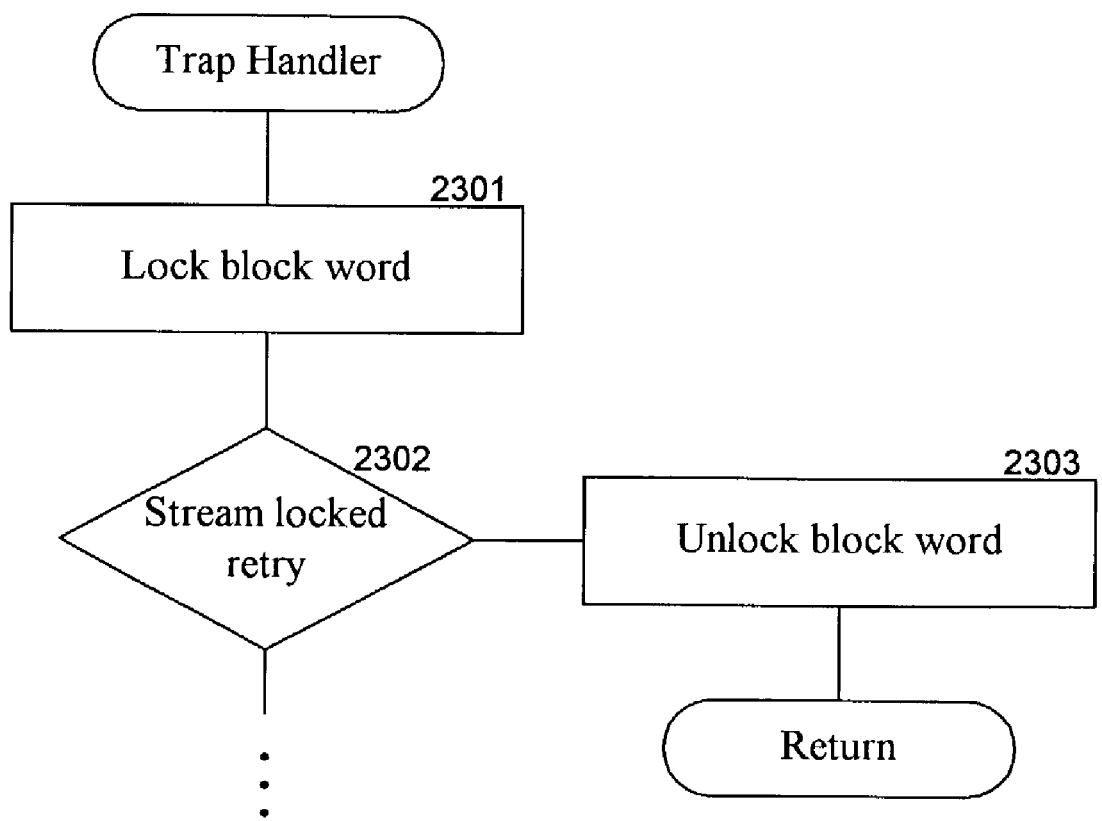
FIG. 23 is a flow diagram of an example trap handler for processing the data blocked exceptions of the observer thread.

FIG. 23 is a flow diagram of an example trap handler for processing the data blocked exceptions of the observer thread. In step 2301, the trap handler locks the blocking word. In step 2302, if the stream is locked and the retry limit has been exceeded, then the trap handler unlocks the blocking word in step 2303 and returns, else the trap handler blocks the thread.

Figure 24:
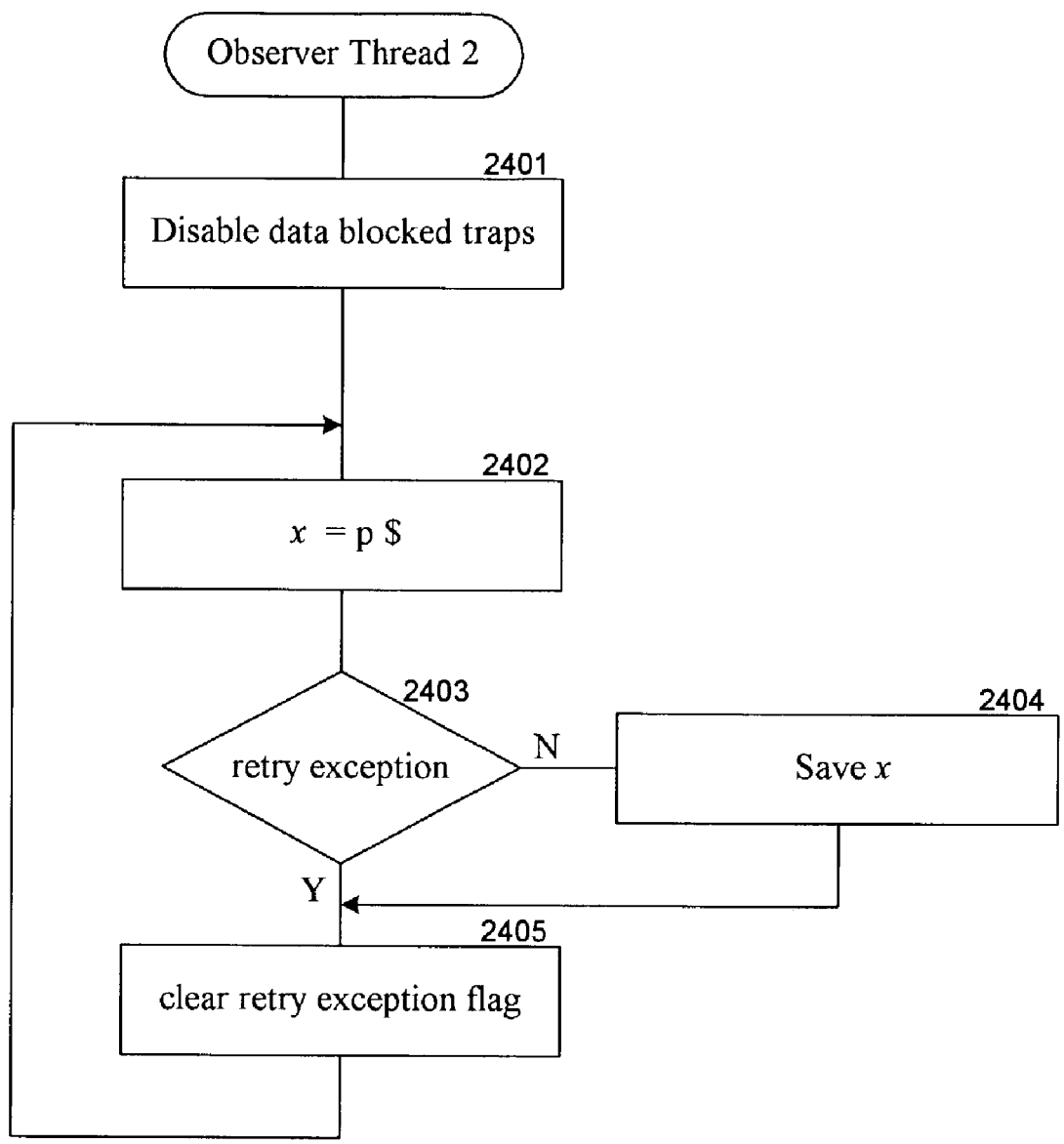
FIG. 24 is a flow diagram of a second embodiment of the observer thread.

FIG. 24 is a flow diagram of a second embodiment of the observer thread. In this embodiment, the observer thread disables the data blocked trap and is provides custom handling when a retry-limit exception is raised. In step 2401, the observer thread disables the data blocked traps. In step 2402, the observer thread issues a read with a synchronization access mode of sync to the observed memory location. In step 2403, if the retry-limit exception was raised, then the observer thread continues at step 2405, else the observer thread continues at step 2404. In step 2404, the observer thread saves the read value. In step 2405, the observer thread clears the retry exception flag and loops to step 2402 to issue the next read.

Restricted Data Structure Access

Figure 25:
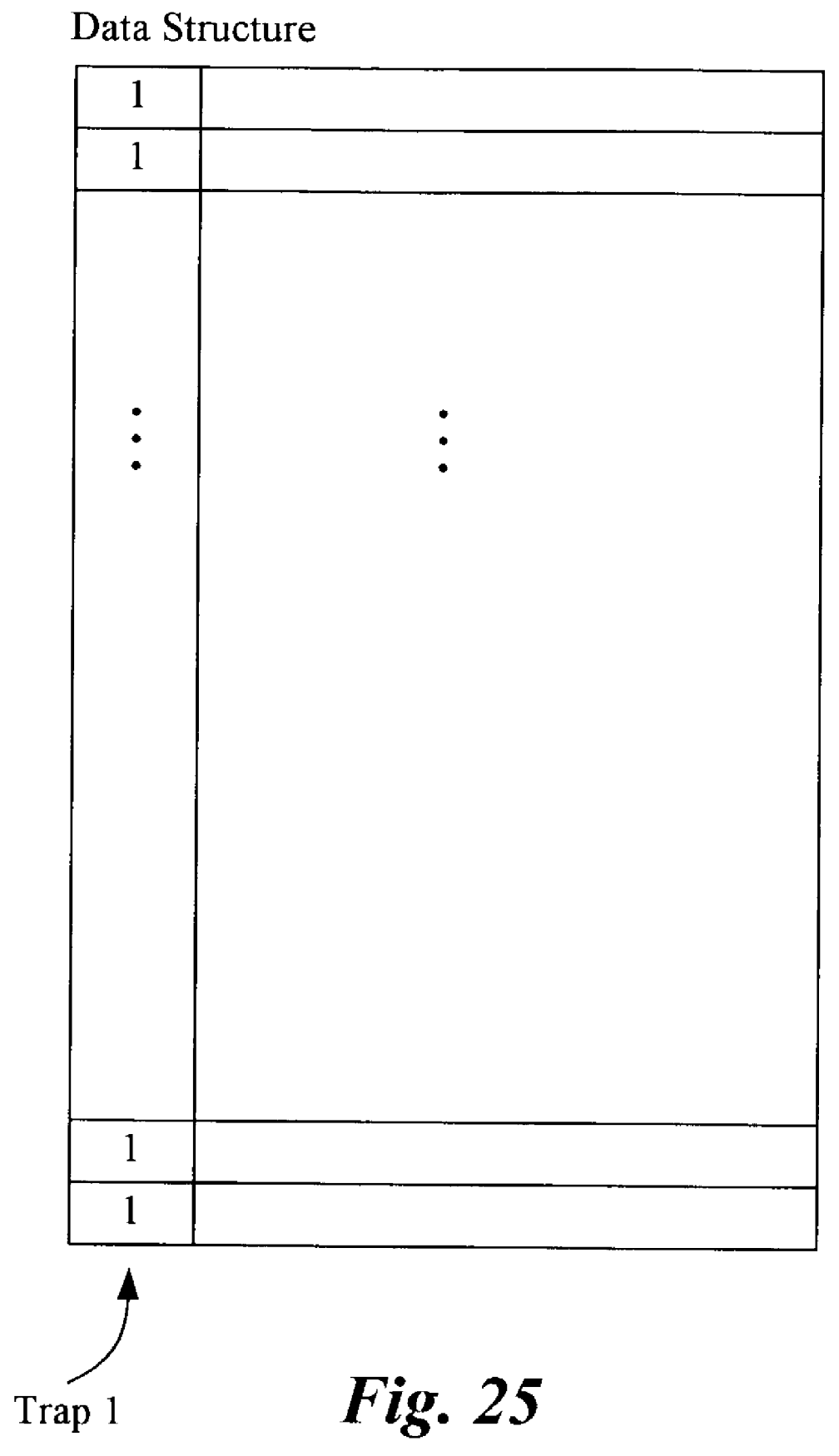

The restricted data structure access technique of the present invention helps detect when a portion of a program is improperly accessing a data structure. FIG. 25 is a block diagram illustrating the data structure with the trap 1 enable bit set in each word of the data structure. Whenever an unauthorized portion of the computer program accesses the data structure while trap 1 is enabled, the trap 0 handler is invoked. However, an authorized portion of computer program can access the data structure with a pointer that specifies that trap 1 is disabled. In this way, an unauthorized access to the data structure can be detected.

Execution Based on Memory Access

Embodiments of the present invention provide various techniques for executing instructions based on access (i.e., load or store) of a memory location. When a memory location with one of its trap bits enabled is accessed, the trap handler is invoked. The trap handler can execute a set of instructions that have been previously designated for that memory location. For example, as discussed above, when the access is a load from the memory location, the trap handler can invoke a function that calculates a data value that is provided as a result of the load. When the access is a store, the trap handler can execute a set of instructions that cannot be executed until a data value is stored in that memory location, but can be executed as soon as a data value is stored. Such execution of a set of instructions is based on "data flow" principles. According to data flow principles, a set of instructions can begin execution as soon as all its input data has been generated. Thus, when the data value is stored in the memory location, the trap handler can determine whether all the inputs for a set of instructions are available. Each memory location that contains an input for the set of instructions can have its trap bit enabled. In this way, each time an input is stored, the trap handler can determine whether all the inputs have already been generated. If so, the set of instructions can be executed or scheduled for execution. A single memory location may also be input to multiple sets of instructions. Thus, the trap handler may determine which sets of instructions use that memory location as input and may store an indication that an input for each set has been generated.

The access of a memory location can also be used to perform complex initialization processing. For example, the initial access of a memory location that points to a data structure, such as a hash table, can be trapped and memory for the data structure can be allocated. When a program first accesses the memory location, the trap handler can allocate the memory for the hash table and store the base address of the hash table in the memory location. The trap handler can disable the trap after initialization or indicate that a different set of instructions is to be executed next time that memory location is accessed. For example, if the data structure is a queue, then the storing of a value into a memory location can be trapped and the value added to the end of the queue, and the loading of the value from that memory location can be trapped and a value removed from the from of the queue.

Multiple threads may access a memory location with a set of instructions associated with it. For example, multiple threads may want to access a queue through a memory location. The need for access to the memory location may change as the threads execute. When no more threads need access to that memory location, the data structures used to keep track of the associated set of instructions can be deallocated. A reference count is associated with that memory location to keep track of the number of threads that need accesses to the memory location. Whenever a thread wants access to the memory location, the thread registers itself with that memory location. The registration process increments the reference count for that memory location. An unregistration process decrements the reference count and deallocates any data structures associated with that memory location when the reference count equals 0. Alternatively, if the memory location is used to access a queue and each thread adds values to and removes values from a queue in pairs, then when the reference count goes to 1, the trap bit of the memory location can be disabled. In this way, no trapping occurs when only one thread is accessing the memory location. If, however, more than one thread is registered to access the memory location, then the trap bit can be enabled to effect the queue processing.

The set of instructions associated with a trap handler need not return to the code that accessed the memory location. In particular, the set of instructions need not return to complete the execution of the instruction that accessed the memory location. Rather, the set of instructions can continue execution at some other location. For example, the set of instructions can execute a Unix-type long jump to a program location that was specified in a Unix-type set jump. In this way, access to the memory location under certain conditions (e.g., a particular value in the memory location) can permanently alter the execution of a program.

In one embodiment, execution based on memory access is used to implement watchpoints of a debugger. Whenever a programmer wants to know when a memory location is modified or accessed, the programmer requests the debugger to set a watchpoint at that memory location. When the debugger is executing as a thread of the program, the debugger can enable a trap bit on that memory location to effect the setting of the watchpoint. The debugger can install its own trap handler. When the trap handler is invoked, the debugger knows that the watched memory location has been accessed. The debugger can then report the access along with the old and the new values to the programmer. The debugger would typically only report the access when the access modifies the value in the memory location or when the access is synchronized (i.e., synchronization access mode of sync or future). The debugger may, however, report whenever any of the access state bits of the memory location are modified. A memory location may not always contain the data value currently associated with that memory location. For example, if the memory location has a thread blocked waiting for a synchronization event to occur at that memory location, then that memory location may contain a reference to a waiter data structure as discussed above. In such a situation, the trap handler can retrieve the actual data value from a waiter data structure and provide it to the programmer as the value of the watched memory location. In one embodiment, the debugger can set a watch point on the value of an expression such as "A+B," when programmer wants to know the value of the expression whenever one of its variables changes. The debugger implements the watching of the expression by trapping access to the memory locations where each variable is stored. For example, the trap bit would be enabled for the memory location corresponding to variables A and B to detect a change in the expression "A+B." Whenever a trap results from access to either of these memory locations, the debugger notifies the programmer that the value of the expression has changed. When a variable is input to more than one expression that is being watched, then the trap handler can indicate that both expressions have been modified.

From the foregoing it will be appreciated that, although specific embodiments of the invention have been described herein for purposes of illustration, various modifications may be made without deviating from the spirit and scope of the invention. The computer instructions implementing the aspects of the present invention and the data structures can be stored on computer-readable medium, such as a memory device, CD-ROM, or disk, or transmitted over transmission mechanism, such as an optic fiber. Accordingly, the invention is not limited except as by the appended claims.

The invention claimed is:

1. A method in a computer system for detecting access to memory, the method comprising:
    establishing an exception indicator for a memory location;
    enabling an exception to be raised when the memory location is accessed; and
    when an exception is raised as a result of access to that memory location,
        identifying the exception indicator that has been established for the memory location, the exception indicator specifying the type of exception processing;
        when the access is a read access, performing processing for read access of the memory location according to the identified exception indicator; and
        when the access is a write access, performing processing for write access of the memory location according to the identified exception indicator.

2. The method of claim 1 wherein the exception indicator is a demand evaluation.

3. The method of claim 2 wherein the exception indicator is established using a side data structure.

4. The method of claim 3 wherein the side indicator is a hash table.

5. The method of claim 2 wherein the exception indicator is established by storing a nondistinguished value in the memory location.

6. The method of claim 2 wherein the processing for read access includes calculating a value associated with the memory location.

7. The method of claim 6 wherein the calculated value is stored in the memory location and returned as the value of the read access.

8. The method of claim 2 wherein the processing for write access includes indicating an error.

9. The method of claim 2 wherein the processing for write access includes storing the value to be written for use in calculating the value for the read access.

10. The method of claim 1 wherein the exception indicator is access of uninitialized memory.

11. The method of claim 10 wherein the exception indicator is established using a side data structure.

12. The method of claim 11 wherein the side data structure is a hash table.

13. The method of claim 10 wherein the side data structure is established by storing a distinguished value in the memory location.

14. The method of claim 10 wherein the processing for read access includes indicating an error.

15. The method of claim 10 wherein the processing for read access includes when speculative loads are enabled, setting a poison bit to indicate the value of the memory location is uninitialized.

16. The method of claim 10 wherein the processing for write access includes storing the value indicated by the write access in the memory location.

17. The method of claim 16 wherein the processing for write access includes disabling the exception so that a subsequent read access will access read the value stored in the memory without generating an exception.

18. The method of claim 1 wherein the exception indicator is access of protected memory.

19. The method of claim 18 wherein the exception indicator is established using a side data structure.

20. The method of claim 19 wherein the side data structure is a hash table.

21. The method of claim 18 wherein the side data structure is established by storing a distinguished value in the memory location.

22. The method of claim 18 wherein the processing for write access and the processing for read access includes preventing access to the memory location.

23. A computer system for accessing memory comprising:
means for establishing an exception indicator for a memory location;
means for enabling an exception to be raised when the memory location is accessed; and
trap handler means for identifying the exception indicator that has been established for the memory location, for performing processing for read access of the memory location according to the identified exception indicator, and for performing processing for write access of the memory location according to the identified exception indicator, wherein the exception indicator specifies the type of exception processing.

24. The computer system of claim 23 wherein the exception indicator is a demand evaluation.

25. The computer system of claim 24 wherein the processing for read access includes calculating a value associated with the memory location.

26. The computer system of claim 25 wherein the calculated value is stored in the memory location and returned as the value of the read access.

27. The computer system of claim 24 wherein the processing for write access includes indicating an error.

28. The computer system of claim 24 wherein the processing for write access includes storing the value to be written for use in calculating a value for a read access.

29. The computer system of claim 23 wherein the exception indicator is access of uninitialized memory.

30. The computer system of claim 29 wherein the processing for read access includes indicating an error.

31. The computer system of claim 29 wherein the processing for read access includes when speculative loads are enabled, setting a poison bit to indicate the value of the memory location is uninitialized.

32. The computer system of claim 29 wherein the processing for write access includes storing the value indicated by the write access in the memory location.

33. The computer system of claim 32 wherein the processing for write access includes disabling the exception so that a subsequent read access will access read the value stored in the memory without generating an exception.

34. The computer system of claim 33 wherein the processing for write access and the processing for read access includes preventing access to the memory location.

35. The computer system of claim 23 wherein the exception indicator is access of protected memory.

36. A method in trap handler for handling access to a memory location with an established exception indicator, the trap handler executing when an exception is raised as a result of access to that memory location, the method comprising:
identifying the exception indicator that has been established for the memory location, the exception indicator specifying the type of exception processing;
when the access is a read access, performing processing for read access of the memory location according to the identified exception indicator; and
when the access is a write access, performing processing for write access of the memory location according to the identified exception indicator.

37. The method of claim 36 wherein the exception indicator is a demand evaluation.

38. The method of claim 37 wherein the processing for read access includes calculating a value associated with the memory location.

39. The method of claim 38 wherein the calculated value is stored in the memory location and returned as the value of the read access.

40. The method of claim 37 wherein the processing for write access includes indicating an error.

41. The method of claim 37 wherein the processing for write access includes storing the value to be written for use in calculating a value for a read access.

42. The method of claim 36 wherein the exception indicator is access of uninitialized memory.

43. The method of claim 42 wherein the processing for read access includes indicating an error.

44. The method of claim 42 wherein the processing for read access includes when speculative loads are enabled, setting a poison bit to indicate the value of the memory location is uninitialized.

45. The method of claim 42 wherein the processing for write access includes storing the value indicated by the write access in the memory location.

46. The method of claim 45 wherein the processing for write access includes disabling the exception so that a subsequent read access will access read the value stored in the memory without generating an exception.

47. The method of claim 36 wherein the exception indicator is access of protected memory.

48. The method of claim 47 wherein the processing for write access and the processing for read access includes preventing access to the memory location.

* * * * *